(12) United States Patent
Song et al.

(10) Patent No.: US 10,616,830 B2
(45) Date of Patent: Apr. 7, 2020

(54) METHOD AND SYSTEM FOR RAT SELECTION IN A MULTI-RAT NETWORK

(71) Applicant: Verizon Patent and Licensing Inc., Arlington, VA (US)

(72) Inventors: Lei Song, Fremont, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 70 days.

(21) Appl. No.: 15/952,411

(22) Filed: Apr. 13, 2018

(65) Prior Publication Data

US 2018/0234916 A1      Aug. 16, 2018

Related U.S. Application Data

(63) Continuation-in-part of application No. 15/235,305, filed on Aug. 12, 2016.

(51) Int. Cl.
| | | |
|---|---|---|
| *H04W 4/00* | (2018.01) | |
| *H04W 48/20* | (2009.01) | |
| *H04W 48/18* | (2009.01) | |
| *H04W 88/06* | (2009.01) | |
| *H04W 76/27* | (2018.01) | |
| *H04W 76/10* | (2018.01) | |
| *H04W 76/28* | (2018.01) | |
| *H04W 88/10* | (2009.01) | |

(52) U.S. Cl.
CPC ........... *H04W 48/20* (2013.01); *H04W 48/18* (2013.01); *H04W 76/10* (2018.02); *H04W 76/27* (2018.02); *H04W 76/28* (2018.02); *H04W 88/06* (2013.01); *H04W 88/10* (2013.01); *Y02D 70/00* (2018.01); *Y02D 70/10* (2018.01); *Y02D 70/12* (2018.01); *Y02D 70/126* (2018.01); *Y02D 70/1224* (2018.01); *Y02D 70/1242* (2018.01); *Y02D 70/1262* (2018.01); *Y02D 70/1264* (2018.01); *Y02D 70/20* (2018.01); *Y02D 70/21* (2018.01); *Y02D 70/24* (2018.01); *Y02D 70/26* (2018.01)

(58) Field of Classification Search
None
See application file for complete search history.

(56) References Cited

U.S. PATENT DOCUMENTS

| | | | |
|---|---|---|---|
| 2009/0104907 A1 | 4/2009 | Otting et al. | |
| 2011/0244874 A1 | 10/2011 | Fodor et al. | |
| 2015/0334724 A1* | 11/2015 | Faccin | H04W 76/36 370/235 |
| 2016/0088542 A1* | 3/2016 | Belghoul | H04W 28/0268 370/331 |
| 2017/0332357 A1 | 11/2017 | Xu et al. | |

\* cited by examiner

*Primary Examiner* — Zewdu A Beyen

(57) ABSTRACT

A method, a device, and a non-transitory storage medium provide a radio access technology selection (RAT) service. The RAT selection service includes using traffic pattern information, coverage level information, and load information as a basis to select a RAT of use for an end device that has multi-RAT capabilities. The RAT selection service may select power preservation configurations for each RAT of the end device.

20 Claims, 23 Drawing Sheets

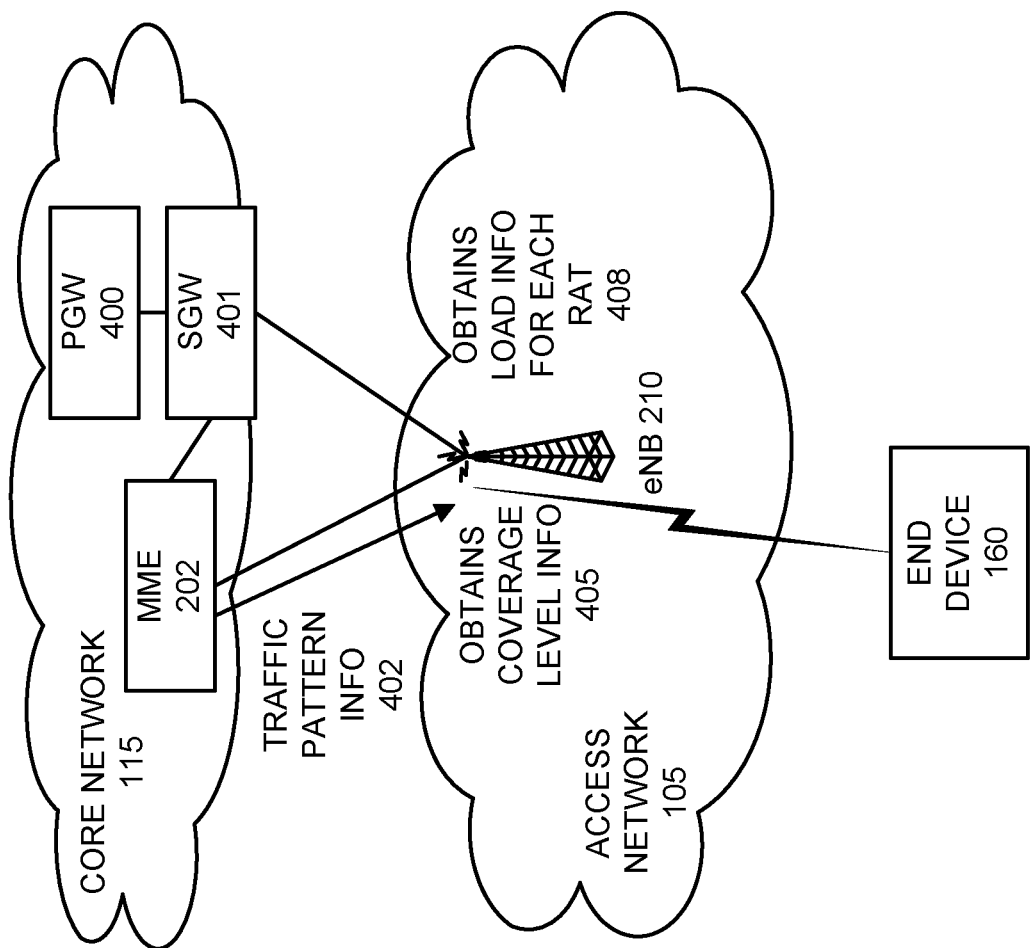

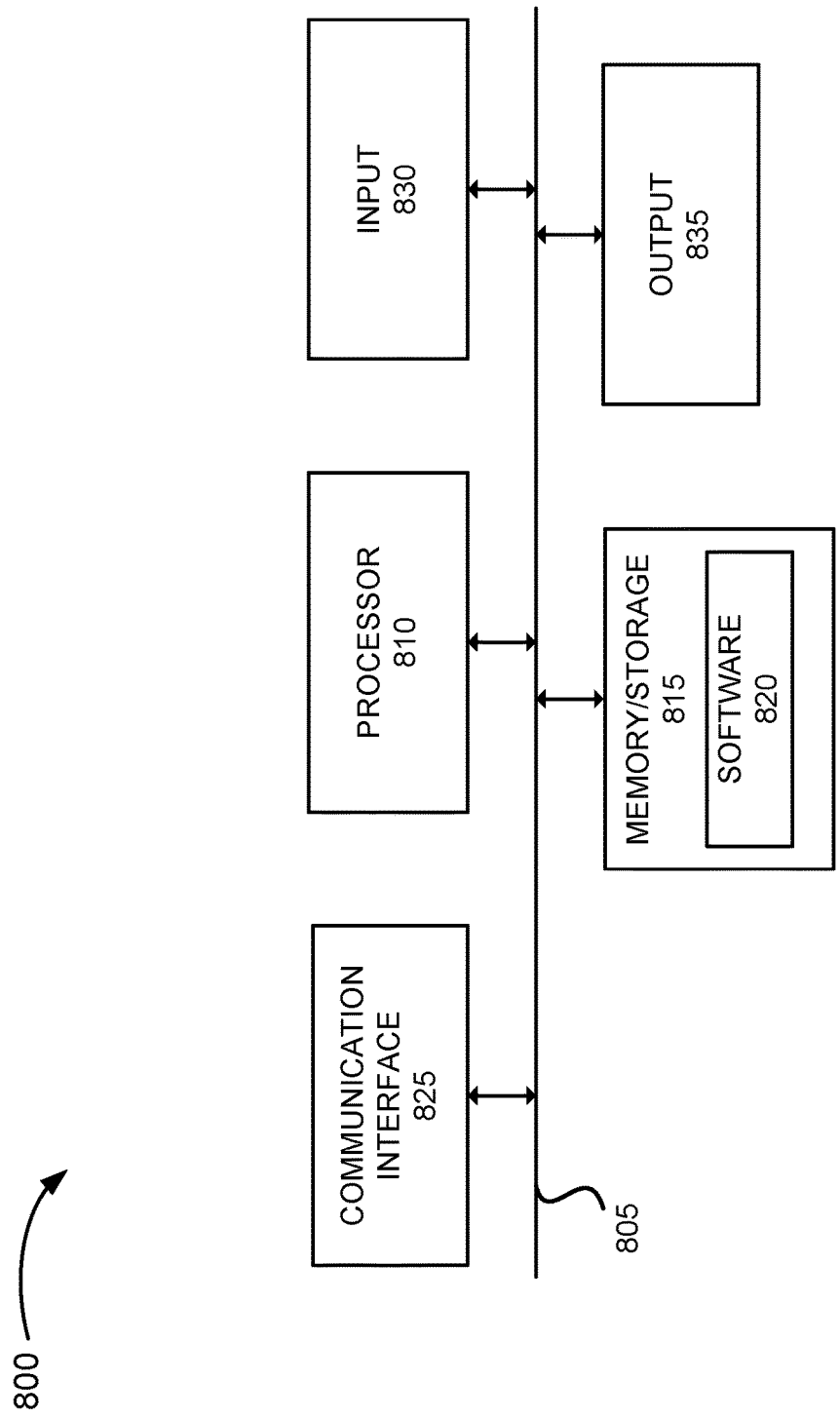

METHOD AND SYSTEM FOR RAT SELECTION IN A MULTI-RAT NETWORK

REFERENCE TO RELATED APPLICATION

This patent application is a continuation-in-part of U.S. patent application Ser. No. 15/235,305, entitled "PRIORITY AND BROADCASTING IN A NETWORK SERVING LTE, eMTC, and NB-IoT" and filed on Aug. 12, 2016, which is incorporated herein by reference in its entirety.

BACKGROUND

In a multi-radio access technology (RAT) environment, the management and selection of a RAT to use in such an environment can present various challenges from an end device perspective and a network-side perspective.

BRIEF DESCRIPTION OF THE DRAWINGS

FIGS. 4A-4F are diagrams illustrating yet another exemplary process of the RAT selection service;

FIG. 8 is a diagram illustrating exemplary components of a device that may correspond to one or more of the devices illustrated herein.

DETAILED DESCRIPTION OF PREFERRED EMBODIMENTS

Figure 1:
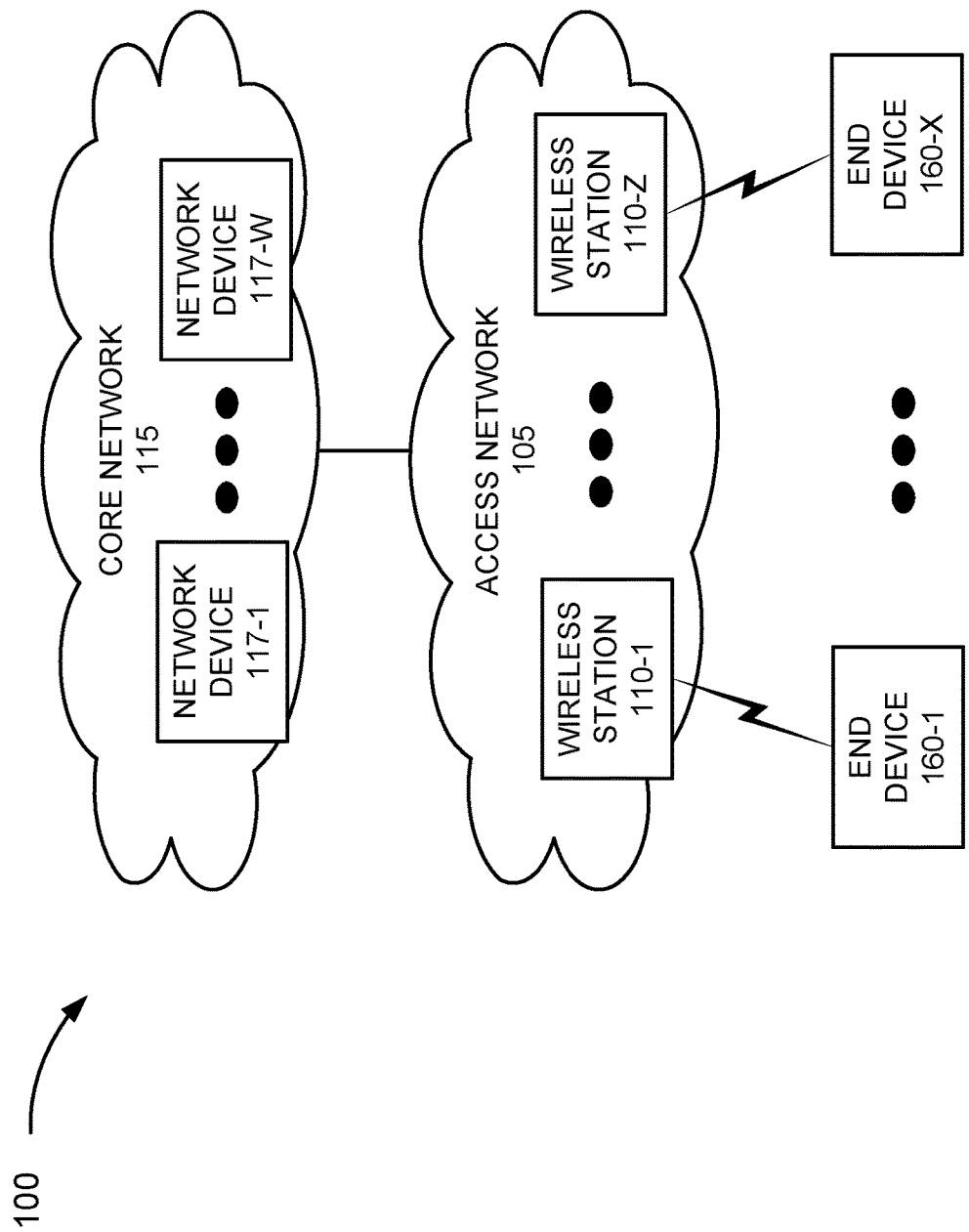
FIG. 1 is a diagram illustrating an exemplary environment in which an exemplary embodiment of a RAT selection service may be implemented.

The following detailed description refers to the accompanying drawings. The same reference numbers in different drawings may identify the same or similar elements. Also, the following detailed description does not limit the invention.

Efficient use of resources in a wireless network is essential to support the continuing increase in demand by end devices. For example, given the ever-increasing number of end devices and various radio access technologies that are emerging, such as NarrowBand Internet of Things (NB-IoT) and enhanced Machine Type Communication (eMTC) (also known as Cat-M1), as well as existing radio technologies, such as Long Term Evolution (LTE), LTE-Advanced (LTE-A), and future generation radio technologies (e.g., Fifth Generation New Radio (5G NR)), radio resources need to be preserved. Additionally, from a network-side perspective, each radio technology is treated independently as a separate system in terms of radio access, etc., due to each end device controlling its own access to the wireless network. However, an end device may operate in multiple modes and/or support multiple RATs. For example, an LTE device may also support both eMTC and NB-IoT technologies. According to another example, a NR device may also support LTE, eMTC, and NB-IoT. Additionally, an end device may include one or multiple applications in which the traffic stemming from the one or multiple applications may not be optimally served by a single RAT.

In view of these considerations, depending on how a RAT is selected, and how the use of available multiple RATs are managed, the end device and the wireless network may not yield the best results in terms of resource use and management, connectivity, battery life, load balancing, and/or other parameters that can negatively impact the end device, the network devices of a wireless network, and the various services stemming therefrom.

According to an exemplary embodiment, a RAT selection service of a wireless network is provided. According to an exemplary embodiment, the RAT selection service selects a RAT, which an end device uses to connect to and, transmit and/or receive information via the wireless network. According to an exemplary embodiment, selection of the RAT is calculated based on traffic pattern information pertaining to an application of an end device, end device coverage information pertaining to a RAT, and cell loading considerations pertaining to each RAT. According to various exemplary embodiments, the traffic pattern information may be obtained from the end device or the network.

According to an exemplary embodiment, a wireless station of an access network provides the RAT selection service. According to an exemplary embodiment, the wireless station includes multiple RATs. According to an exemplary implementation, the multiple RATs may include two or more of 5G NR, LTE, LTE-Advanced, eMTC, or NB-IoT. According to other exemplary implementations, the multiple RATs may include other well-known wireless technologies (e.g., legacy wireless technologies (e.g., Code Division Multiple Access (CDMA), etc.)). According to an exemplary implementation, the multiple RATs are provided within a same band. For example, different sub-bands of the band may be allocated to different RATs. According to an exemplary implementation, the multiple RATs may have the same Transmit Time Interval (TTI). According to an exemplary implementation, the TTI is time-aligned among the multiple RATs. In this way, the multiple RATs may be provided in an integrated fashion that allows a multi-RAT end device to switch between RATs more readily. According to other exemplary implementations, the TTI may not be time-aligned among the multiple RATs. Still further, according to yet other exemplary implementations, the two or more RATs may be time-aligned, and a remaining one or multiple RATs may not.

According to an exemplary embodiment, the RAT selection service may provide the multi-RAT end device, for each RAT, a power saving mode (PSM) configuration, a discontinuous reception (DRX), an extended DRX (eDRX) configuration, and/or similar configuration pertaining to power preservation. According to an exemplary implementation, the configuration may be different between two or more RATs. According to another exemplary implementation, the configuration may be the same between two or more RATs. The RAT selection service may provide configuration information for each RAT based on RAT capability information pertaining to the end device.

In view of the foregoing, the RAT selection service allows the wireless network to manage multiple RATs of end devices and their access to the wireless network. As a result, resource use and management, connectivity, battery life, load balancing of resources, access and provisioning of wireless services, and/or other parameters may be improved from an end device perspective and a network perspective.

For example, the integration of multiple RATs that may share the same TTI may improve coordinated scheduling and radio resource utilization. Further, the integration of multiple RATs, as described herein, may positively impact connectivity and the transmittance and reception of data. For example, while in a connected mode, an end device may perform an inter-RAT handover to a second RAT when RF conditions of a first RAT are unsuitable. Additionally, for example, the selection and configuration of a PSM, a DRX, and/or eDRX for each RAT may improve power consumption at the end device. Further, for example, the RAT selection service allows the network to select the RAT on behalf of the end device based not only on radio conditions and load balancing factors but also characteristics of data to be transmitted or received, which may not be best served by a single RAT. In some cases, for example, different types of traffic may stem from a single end device application. For example, an IoT application that may report data frequently and involve a small amount of data may also undergo a software upgrade that may involve a large amount of data and occurs infrequently.

FIG. 1 is a diagram illustrating an exemplary environment 100 in which an exemplary embodiment of a RAT selection service may be implemented. As illustrated, environment 100 includes an access network 105. Access network 105 includes wireless stations 110-1 through 110-Z (also referred to collectively as wireless stations 110 and, individually or generally as wireless station 110). Environment 100 further includes a core network 115. Core network 115 includes network devices 117-1 through 117-W (also referred to collectively as network devices 117 and, individually or generally as network device 117). Environment 100 also includes end devices 160-1 through 160-X (also referred to collectively as end devices 160 and, individually or generally as end device 160). According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

Access network 105 includes one or multiple networks of one or multiple types. For example, access network 105 may be implemented to include a terrestrial network and/or a satellite network. According to an exemplary implementation, access network 105 includes a RAN. For example, the RAN may be a Third Generation (3G) RAN, a 3.5G RAN, a Fourth Generation (4G) RAN, a 4.5G RAN, or a future generation RAN (e.g., a Fifth Generation (5G) RAN). By way of further example, access network 105 may include an Evolved UMTS Terrestrial Radio Access Network (E-UTRAN) of an LTE network or an LTE-A network, a UTRAN, a Universal Mobile Telecommunications System (UMTS) RAN, a Global System for Mobile Communications (GSM) RAN, a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.).

Wireless station 110 includes a network device that has computational and wireless communicative capabilities. Wireless station 110 may be implemented as a base station (BS), a base transceiver station (BTS), a Node B, an evolved Node B (eNB), an evolved LTE (eLTE) eNB, a next generation Node B (gNB), a remote radio head (RRH), an RRH and a baseband unit (BBU), a BBU, or other type of wireless node (e.g., a picocell node, a femtocell node, a microcell node, etc.) that provides wireless access to access network 105.

According to an exemplary embodiment, wireless station 110 includes logic that provides the RAT selection service, as described herein. According to an exemplary embodiment, wireless station 110 operates according to multiple RATs. According to various exemplary implementations, wireless station 110 operates according to two or more of 5G NR, LTE-A, LTE, eMTC, NB-IoT, a legacy wireless access technology, or other well-known wireless access technology. The frequency bands, sub-bands, and/or carrier frequencies in relation to the RAT may be configured by an administrator of the wireless network.

According to an exemplary embodiment, the multiple RATs, from which the RAT selection service uses, may operate within a same frequency band. For example, various widebands (e.g., 1, 2, 4, 10, 13, etc.) may be used to support the multiple RATs depending on the geographic area, the service provider, and/or the multiple RATs involved. By way of further example, eMTC may operate in one or several 1.4 Megahertz (MHz) sub-bands of the LTE wideband, which may include hopping. Additionally, for example, NB-IoT may operate in a region of the LTE wideband (e.g., in the middle 2.8 MHz sub-band of the LTE band) or in one or several narrowbands or NB-IoT carrier frequencies of the eMTC sub-bands.

According to an exemplary embodiment, wireless station 110 includes logic that provides the multiple RATs in an integrated fashion. For example, the TTI for each RAT may be time-aligned among the multiple RATs.

According to an exemplary embodiment, wireless station 110 includes logic that selects a RAT, which an end device uses to connect to and, transmit and/or receive information via the wireless network. According to an exemplary embodiment, wireless station 110 selects the RAT based on capability information of an end device and, one or more of traffic pattern information pertaining to data of an application of the end device, end device coverage information pertaining to the RAT, and cell loading considerations pertaining to each RAT. According to various exemplary embodiments, the traffic pattern information may be obtained from end device 160 or network device 117.

According to an exemplary embodiment, wireless station 110 includes logic that selects a RAT based on the methods and systems described in U.S. patent application Ser. No. 15/235,305. According to an exemplary implementation, wireless station 110 may select the RAT for initial or first access to the wireless network based on the access service described therein.

According to an exemplary embodiment, wireless station 110 includes logic that transmits to end device 160 configuration information pertaining to multiple RATs as a part of a Radio Resource Control (RRC) Connection procedure for one of the multiple RATs. For example, wireless station 110 may transmit an RRC Connection Setup message associated with a first RAT, which includes signaling radio bearer (SRB) configuration information pertaining to one or multiple other RATs (e.g., a second RAT, a third RAT, etc.). The SRB configuration information may be carried in an information element (IE) of the RRC Connection Setup message.

Core network 115 includes one or multiple networks of one or multiple types. For example, core network 115 may be implemented to include a terrestrial network and/or a satellite network. According to an exemplary implementation, core network 115 includes a complementary network pertaining to the one or multiple RANs described. For example, core network 115 may include the core part of an LTE network, an LTE-A network, a 5G network, a legacy network, and so forth. Depending on the implementation, core network 115 may include various network elements, such as a mobility management entity (MME), a user plane function (UPF), a session management function (SMF), a core access and mobility management function (AMF), a unified data management (UDM), a packet data network gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 115.

According to an exemplary embodiment, at least one of network devices 117 includes logic that provides the RAT selection service, as described herein. As previously described, the RAT selection service may include configuring a PSM, a DRX, an eDRX, and/or similar configurations pertaining to power preservation for end device 160. According to an exemplary implementation, an MME or an AMF of core network 115 may configure end device 160 via wireless station 110. According to other examples, a serving GPRS support node (SGSN) or other network device/element that manages such configurations may be implemented.

According to an exemplary embodiment, the RAT selection service may be provisioned to a single identity of end device 160, which has multiple RAT capabilities, within the wireless network. According to an exemplary implementation, at least one of network devices 117 provides such provisioning. For example, the HSS, the UDM, or the Authentication Server Function (AUSF) may provide the single identity provisioning. According to an exemplary embodiment, the single identity provisioning may be based on the capability information provided by end device 160. For example, during initial access, end device 160 may provide the capability information, which may include a unique identifier of end device 160.

End device 160 includes a device that has computational and wireless communicative capabilities. End device 160 may be implemented as a mobile device, a portable device, or a stationary device. End device 160 may be implemented as an MTC device, an IoT device, a machine-to-machine (M2M) device, or an end user device. For example, the end user device may be implemented as a smartphone, a personal digital assistant, a tablet, a netbook, a phablet, a wearable device, a set top box, an infotainment system in a vehicle, a game system, a music playing system, or some other type of wireless device. End device 160 includes one or multiple applications. For example, the one or multiple applications may provide various applications and/or services pertaining to broadband access in dense areas (e.g., pervasive video, smart office, operator cloud services, video/photo sharing, etc.), broadband access everywhere, higher user mobility (e.g., high speed train, remote computing, moving hot spots, etc.), Internet of Things (IoTs) (e.g., smart wearables, sensors, mobile video surveillance, utility meter, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), real-time communications (e.g., voice, video conferencing, etc.), Web access, and/or other end user/non-end user services or assets.

According to an exemplary embodiment, end device 160 includes logic that provides the RAT selection service. For example, according to an exemplary embodiment, end device 160 provides capability information to the wireless network (e.g., access network 105, core network 115). The capability information includes data that indicates the multiple RATs supported by end device 160. Also, according to an exemplary embodiment, end device 160 provides traffic pattern information to the wireless network. The traffic pattern information may indicate a characteristic of a traffic flow, as described herein. The form of the traffic pattern information (e.g., a numerical value, a parameter and a parameter value pair, etc.) may be administratively configured. According to an exemplary implementation, end device 160 includes the traffic pattern information in an IE that is packaged in an RRC Connection request or other message of a procedure to establish a radio connection with access network 105.

According to an exemplary embodiment, end device 160 operates according to two or more RATs. According to an exemplary implementation, end device 160 operates according to two or more of 5G NR, LTE-A, LTE, eMTC, or NB-IoT. Each RAT may afford end device 160 a particular data rate within a certain range. Additionally, each RAT may afford end device 160 a range of coverage. For example, eMTC may provide a coverage extension up to about 15 dB or up to about 155 dB maximum coupling loss (MCL) (155 dB=140 dB+15 dB) in which 140 dB is the MCL for traditional LTE coverage. NB-IoT may provide coverage extension up to about 24 dB or about 164 dB MCL (e.g., 164 dB=140 dB+24 dB). When using a particular RAT, end device 160 may operate within a frequency band and, a sub-band, a narrow band, and/or a carrier frequency attributable to the RAT.

According to an exemplary embodiment, end device 160 may be configured with a default RAT of which to access a wireless network and/or transmit/receive data via the wireless network. For example, the default RAT may be a RAT that is most used by end device 160 in view of the application(s) resident on end device 160 and a characteristic of traffic (e.g., traffic pattern information) that flows to/from the application(s). According to other examples, the default RAT may be characteristic of other criteria and/or aspects. According to such an embodiment, end device 160 may include logic, in support of the RAT selection service, that switches to another RAT (e.g., a non-default RAT), and upon completion of a communication or a communication session using the other RAT, switches back to the default RAT.

Figure 2A:
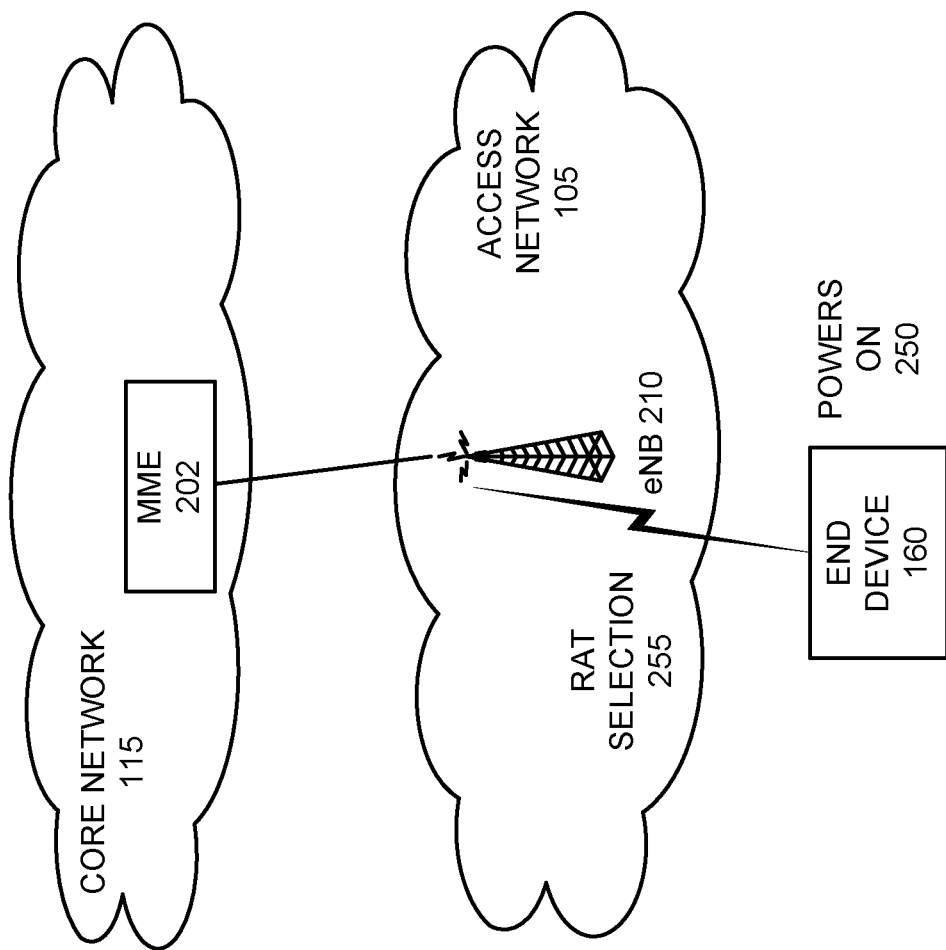
FIGS. 2A-2C are diagrams illustrating an exemplary process of the RAT selection service.
Figure 2B:
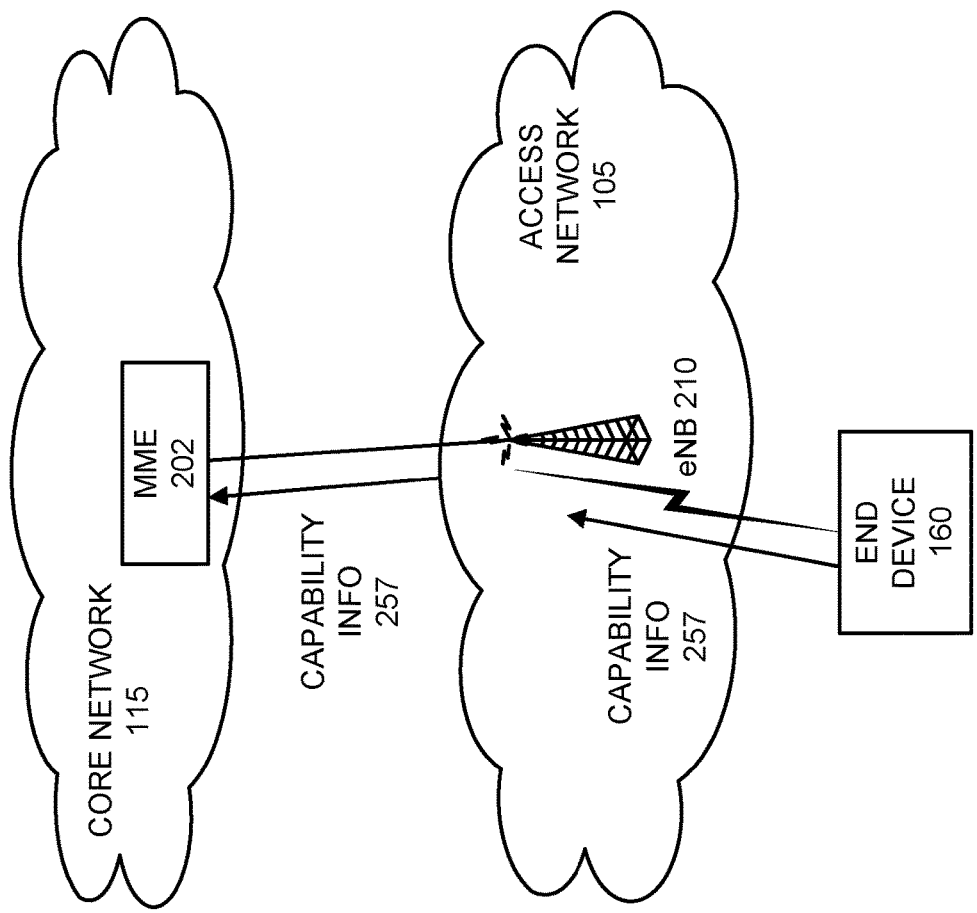
Figure 2C:
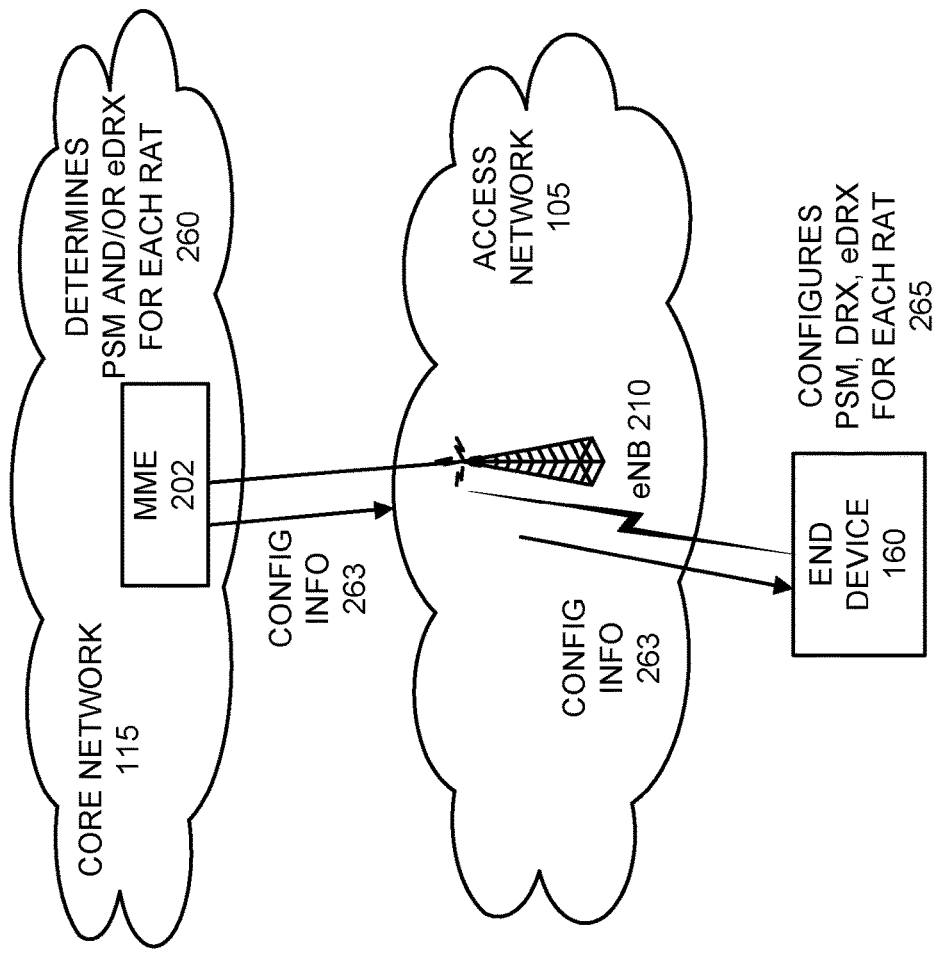

FIGS. 2A-2C are diagrams illustrating an exemplary process of the RAT selection service. In FIGS. 2A-2C, assume that access network 105 is implemented as an E-UTRAN of an LTE or LTE-A network, and that wireless station 110 is implemented as an eNB 210. Assume that end device 160 has multi-RAT capabilities. Also assume that core network 115 is implemented as an Evolved Packet Core (EPC), and network device 117 includes an MME 202.

Referring to FIG. 2A, according to an exemplary scenario, end device 160 powers on at 250. Subsequent to powering on, a RAT is selected at 255 based on the access service described in U.S. patent application Ser. No. 15/235, 305. For example, according to an exemplary embodiment, eNB 210 may transmit access information to end device 160. The access information may include an order of priority pertaining to multiple RATs. End device 160 may select the RAT to use based on the access information. According to another exemplary embodiment, end device 160 may calculate an order of priority. For example, as described therein, end device 160 may calculate a real-time access order value $R_k$ for each RAT based on a fitness value $A_k$, a historical value $H_k$, and a priority value $P_k$. According to still other exemplary embodiments, the access service may include other operations and/or processes as described in U.S. patent application Ser. No. 15/235,305.

Referring to FIG. 2B, subsequent to the selection of the RAT, end device 160 may transmit capability information 257. For example, the capability information may be transmitted during an attachment procedure. The capability information includes information that indicates the RATs supported by end device 160. For example, the capability information may indicate that end device 160 supports 5G NR, LTE, and eMTC. According to other examples, the capability information may indicate additionally, fewer, and/or different RATs. Alternatively, according to other exemplary implementations, MME 202 may obtain the capability information from subscription information pertaining to end device 160. For example, during the attachment procedure, MME 202 may obtain the capability information from an HSS or other data repository device that stores subscription information (e.g., a user profile server function (USPF), a home location register (HLR), an equipment identity register (EIR), a unified database management (UDM) device, etc.). Still further, according to other exemplary implementations, MME 202 may obtain the capability information from eNB 210. For example, eNB 210 may obtain the capability information from end device 160 during an RRC connection procedure with eNB 210. eNB 210 may store this information and subsequently transmit the capability information to MME 202 (e.g., independent from the attach procedure, include the capability information in an attach request pertaining to end device 160, etc.).

As illustrated, according to this example, the capability information 257 may be forwarded by eNB 210 to MME 202. According to other examples, eNB 210 or another type of wireless station 110 may forward the capability information to a different network device 117 (e.g., an AMF, an SGSN, etc.) that may configure a PSM, a DRX, an eDRX, and/or other configuration pertaining to power preservation for end device 160.

Referring to FIG. 2C, in response to receiving the capability information, MME 202 determines a PSM, a DRX, and/or an eDRX for each RAT 260 indicated in the capability information. For example, MME 202 may select the PSM, the DRX, and/or the eDRX for each RAT based on the capability information. The PSM, the DRX, and/or the eDRX configuration information may include a timer value and time unit of measurement (e.g., minutes, hours, etc.). The timer value may be, for example, a single timer value or a range of timer values of which any timer value within the range may be used. According to other examples, there may be multiple timers selected. For example, for PSM, MME 202 may select a timer that manages how long end device 160 stays in an active or idle mode and another timer that indicates when end device 160 informs the network with periodic tracking area updates. According to still other examples, MME 202 may select the PSM, the DRX, and/or the eDRX based on other types of information, such as the type of RAT and, the type of application (e.g., real-time, critical, etc.) to be used by end device 160, traffic pattern information, historical information pertaining to previous use/behavior of end device 160, subscription information of end device 160, and/or a timer value provided by end device 160 during the attachment procedure. According to an exemplary implementation, MME 202 may store a database or other data structure that correlates RAT information to PSM, DRX, and/or eDRX values. The database or the data structure may also correlate other information (e.g., types of application, traffic pattern information, etc.) with the RAT information.

As further illustrated in FIG. 2C, MME 202 may transmit the PSM, the DRX, and/or the eDRX configuration information 263 pertaining to each RAT to end device 160 via eNB 210. In response to receiving the configuration information, end device 160 may configure a PSM, a DRX, and/or an eDRX for each RAT 265.

Although FIGS. 2A-2C illustrate an exemplary process of the RAT selection service, according to other exemplary embodiments, additional, fewer, and/or different operations may be performed.

Figure 3A:
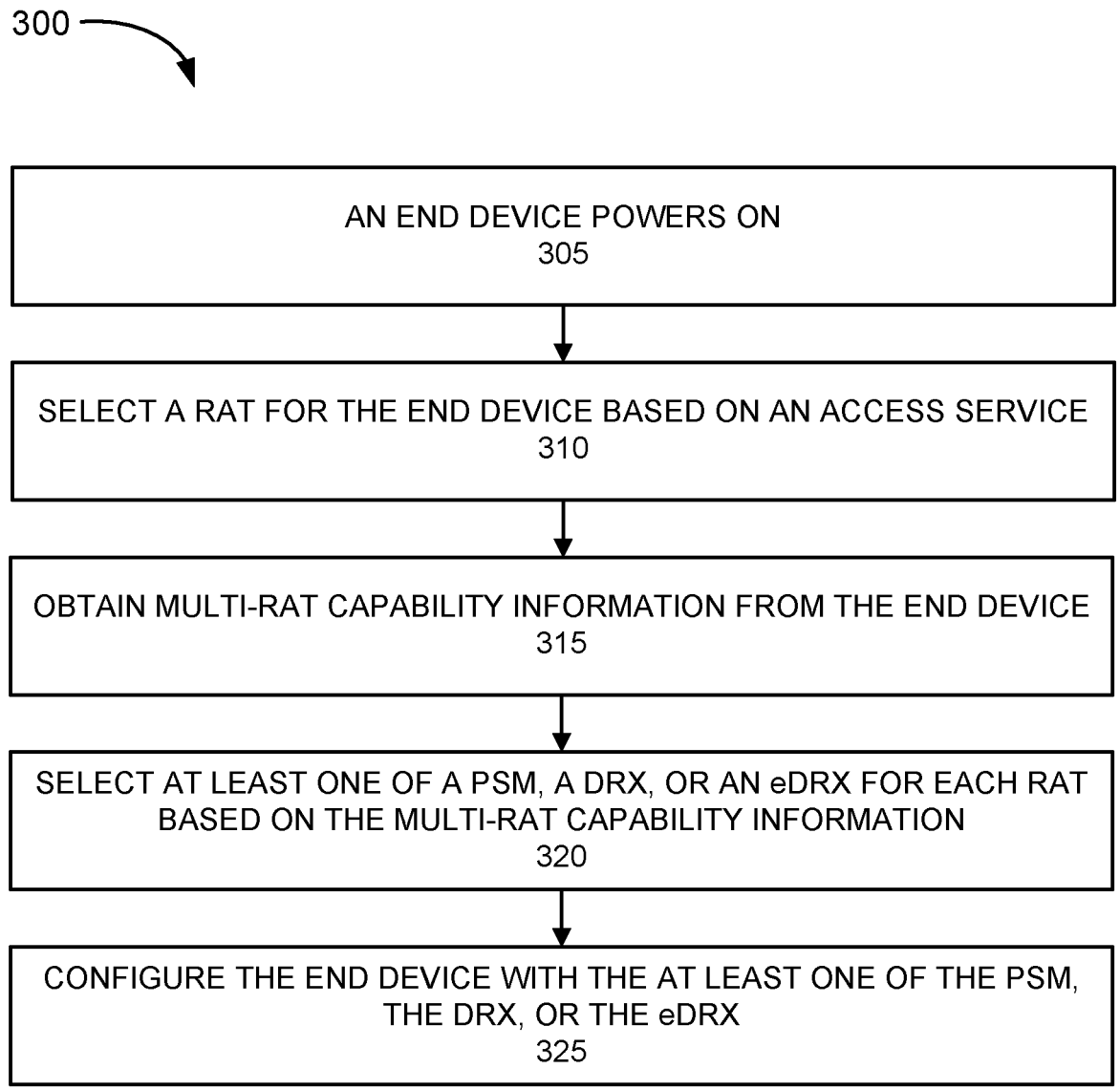
FIG. 3A is a flow diagram of an exemplary process of the RAT selection service.

FIG. 3A is a flow diagram illustrating an exemplary process 300 pertaining to the RAT selection service. According to an exemplary embodiment, MME 202 or other network device 117 that may perform access and/or mobility management (e.g., an AMF, etc.) may perform steps of process 300. For example, with reference to FIG. 8, as described herein, processor 810 executes software 820 to perform the steps illustrated in FIG. 3A and described herein.

Referring to FIG. 3A, block 305 of process 300, an end device may power on. For example, end device 160 may power on and perform a boot up process. In block 310, a RAT may be selected for the end device based on an access service. For example, a RAT for initial attachment to the network may be selected according to the access service described in U.S. patent application Ser. No. 15/235,305.

In block 315, multi-RAT capability information pertaining to the end device may be obtained. For example, MME 202 or other network device 117 that may perform access and/or mobility management may receive multi-RAT capability information of end device 160. According to an exemplary implementation, end device 160 may transmit a non-access stratum (NAS) attach request, which includes an IE that carries the multi-RAT capability information, to MME 202. According to other exemplary implementations, MME 202 may obtain the multi-RAT capability information from an HSS or other data repository device. For example, the subscription information of end device 160 may include the multi-RAT capability information. According to still other exemplary implementations, end device 160 may transmit the multi-RAT capability information in an RRC message (e.g., an RRC Connection Request message, an RRC Connection Setup Complete message) or a dedicated/separate message.

In block 320, at least one of PSM, a DRX, or an eDRX for each RAT may be selected based on the multi-RAT capability information. For example, MME 202 may perform a lookup based on the multi-RAT capability information and select timer values pertaining to each RAT based on the lookup.

In block 325, the end device may be configured with at least one of a PSM, a DRX, or an eDRX for each RAT based on the multi-RAT capability information. For example, MME 202 may transmit the selected PSM, DRX, and/or eDRX configuration information to end device 160. According to an exemplary implementation, MME 202 may transmit a NAS response, which includes an IE that carries the PSM, DRX, and/or eDRX configuration information, to end device 160. Upon receipt, end device 160 may configure itself based on the PSM, DRX, and/or eDRX configuration information.

Although FIG. 3A illustrates an exemplary process 300 of the RAT selection service, according to other embodiments, process 300 may include additional operations, fewer operations, and/or different operations than those illustrated in FIG. 3A and described herein. For example, a timer value may be configured on end device 160 stemming from procedures other than an attach procedure (e.g., a tracking area update (TAU) procedure, a routing area update (RAU) procedure, etc.). Additionally, as previously described, end device 160 may request a timer value during a procedure, which may or may not be granted by the network.

Figure 3B:
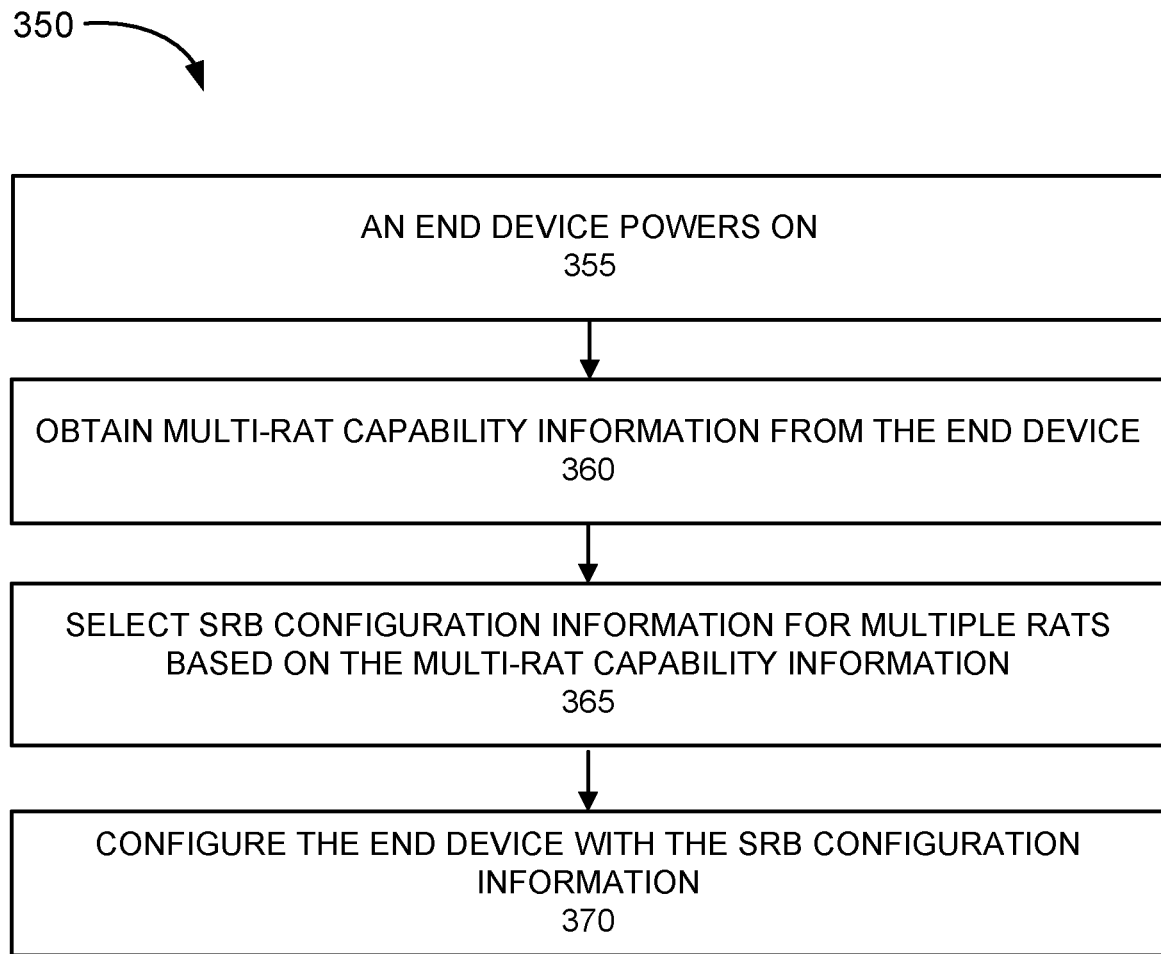
FIG. 3B is a flow diagram of another exemplary process of the RAT selection service.

FIG. 3B is a flow diagram illustrating another exemplary process 350 pertaining to the RAT selection service. According to an exemplary embodiment, eNB 210 or other wireless station 110 may perform steps of process 350. For example, processor 810 executes software 820 to perform the steps illustrated in FIG. 3B and described herein.

Referring to FIG. 3B, block 355 of process 350, an end device may power on. For example, end device 160 may power on and perform a boot up process.

In block 360, multi-RAT capability information pertaining to the end device may be obtained. For example, end device 160 may transmit multi-RAT capability information in an RRC message (e.g., an RRC Connection Request message) or a dedicated/separate message includes the multi-RAT capability information.

In block 365, in response to receiving the multi-RAT capability information, SRB configuration information for end device 160 may be selected based on the multi-RAT capability information. For example, eNB 210 may select SRB configuration information (e.g., pertaining to SRB1, SRB2, etc.) for a default RAT and one or multiple SRB configuration information for one or multiple additional RATs. The SRB configuration information may include Radio Link Control (RLC) configuration information for the SRB (e.g., uplink, downlink) and logical channel configuration (e.g., priority, prioritized bit rate, logical channel group, etc.), and so forth.

In block 370, the end device may be configured with the SRB configuration information. For example, eNB 210 may generate and transmit an RRC Connection Setup message that includes an IE that carries the SRB configuration information. The RRC Connection Setup message may also include configuration information pertaining to physical channels, uplink power control, CQI reporting, and so forth. In response to receiving the RRC Connection Setup message, end device 160 may configure itself using the SRB configuration information.

Although FIG. 3B illustrates an exemplary process 350 of the RAT selection service, according to other embodiments, process 350 may include additional operations, fewer operations, and/or different operations than those illustrated in FIG. 3B and described herein.

FIGS. 4A-4F are diagrams illustrating another exemplary process of the RAT selection service. In FIGS. 4A-4F, assume that access network 105 is implemented as an E-UTRAN of an LTE or an LTE-A network, and that wireless station 110 is implemented as an eNB 210. Assume that end device 160 has multi-RAT capabilities. Also assume that core network 115 is implemented as an EPC, and network device 117 includes an MME 202, a PGW 400, and an SGW 401. According to an exemplary scenario, eNB 210 has downlink data of an application to transmit to end device 160. For example, the downlink data may pertain to a critical application or another type of application, as described herein.

Referring to FIG. 4A, eNB 210 may obtain traffic pattern information 402 from MME 202. According to an exemplary implementation, eNB 210 may obtain traffic pattern information 402 from MME 202 during an initial/first attachment procedure. By way of example, an attach response from MME 202 to eNB 210 may carry the traffic pattern information. eNB 210 may store the traffic pattern information of end device 160.

According to various exemplary implementations, the traffic pattern information may be represented in various ways. For example, the traffic pattern information may indicate a numerical value (e.g., 0, 1, 2, 3, etc.) that represents a type of traffic. According to other examples, the traffic pattern information may include one or multiple parameter/parameter value pairs that indicate a type of traffic. For example, a parameter pair may pertain to the type of application (e.g., real, critical, best-effort, etc.), the packet size, the amount of data, the duration of the traffic, and/or other characteristics of the traffic flow.

As further illustrated in FIG. 4A, eNB 210 may obtain other types of information, such as coverage level information 405 and load information for each RAT 408. For example, as previously described, coverage information of end device 160 may indicate various coverages or coverage extensions depending on the RAT used/supported by end device 160, as well as other characteristics, such as data rate afforded by the RAT. Also, for example, eNB 210 may estimate a current load for each RAT of eNB 210 that is supported by end device 160. eNB 210 may select the RATs based on the RAT capability information of end device 160. According to an exemplary implementation, eNB 210 includes logic that provides a resource monitoring service. The resource monitoring service monitors the resource utilization that occurs over time at eNB 210. The Radio Resource Management (RRM) logic of eNB 210 may be a part of the logic that supports the resource monitoring service. eNB 210 may also include other existing, conventional, well-known, or proprietary resource monitoring technologies to monitor resource utilization and estimate a current load. For example, eNB 210 may estimate the load for LTE, eMTC mode A mode, and the eMTC mode B mode. The load of a cell may be measured in terms of usage of various resources relative to their limits or capacities. For example, these various resources may include radio resource usage, Physical Resource Block (PRB) usage, transmit/receive powers usage, throughput in the uplink/downlink directions, uplink/downlink Guaranteed Bit Rates (GBRs) usage, and/or uplink/downlink non-GBRs usage.

eNB 210 may include additional logic to measure other types of resource usages, such a hardware load indicator, an Si Transport Network Load indicator, a cell capacity value, etc., as well as other measurements, criteria, values, indicators, etc. (e.g., Almost Blank Subframe (ABS) information, handover failure rate, inter-cell interference, etc.), pertaining to cell and wireless network operability (e.g., load balancing, (enhanced) inter-cell interference coordination (ICIC), handover (e.g., intra-radio access technology (RAT), inter-RAT), etc.). The current load may pertain to the load associated with end devices 160 in active mode.

According to an exemplary embodiment, eNB 210 attributes the estimated load to a given RAT. Depending on the implementation of eNB 210, eNB 210 may have physical resources (e.g., hardware, software, etc.) to support a particular RAT or, alternatively, physical resources may be shared among multiple RATs. eNB 210 may obtain and evaluate resource utilization data and derived data (e.g., execution statistics data, etc.) to determine the load of a RAT. For example, eNB 210 may count the percentage of PRB usages for each RAT. By way of further example, if eNB 210 allocates 5 PRBs for NB-IoT (i.e., 5 NB-IoT channels), and for the past 10 seconds, an average of 4.5 PRBs are used, then the loading for NB-IoT is 90%. eNB 210 may also monitor other metrics to decide loading, such as, for example, the drop call rate, packet error rate, packet delay, handover statistics, and/or other metrics.

eNB 210 may calculate a loading metrics based on the current loads for each RAT supported by end device 160 and is supported by eNB 210. For example, according to an exemplary implementation, eNB 210 includes logic to calculate, for each RAT (e.g., either all RATs supported by eNB or only RATs supported by end device 160), a ratio between the current load and a nominal load (e.g., a target load, an optimal load, etc.). According to other exemplary implementations, the loading metric for each mode of access may be calculated based on other well-known or proprietary methods pertaining to load balancing.

Figure 4B:
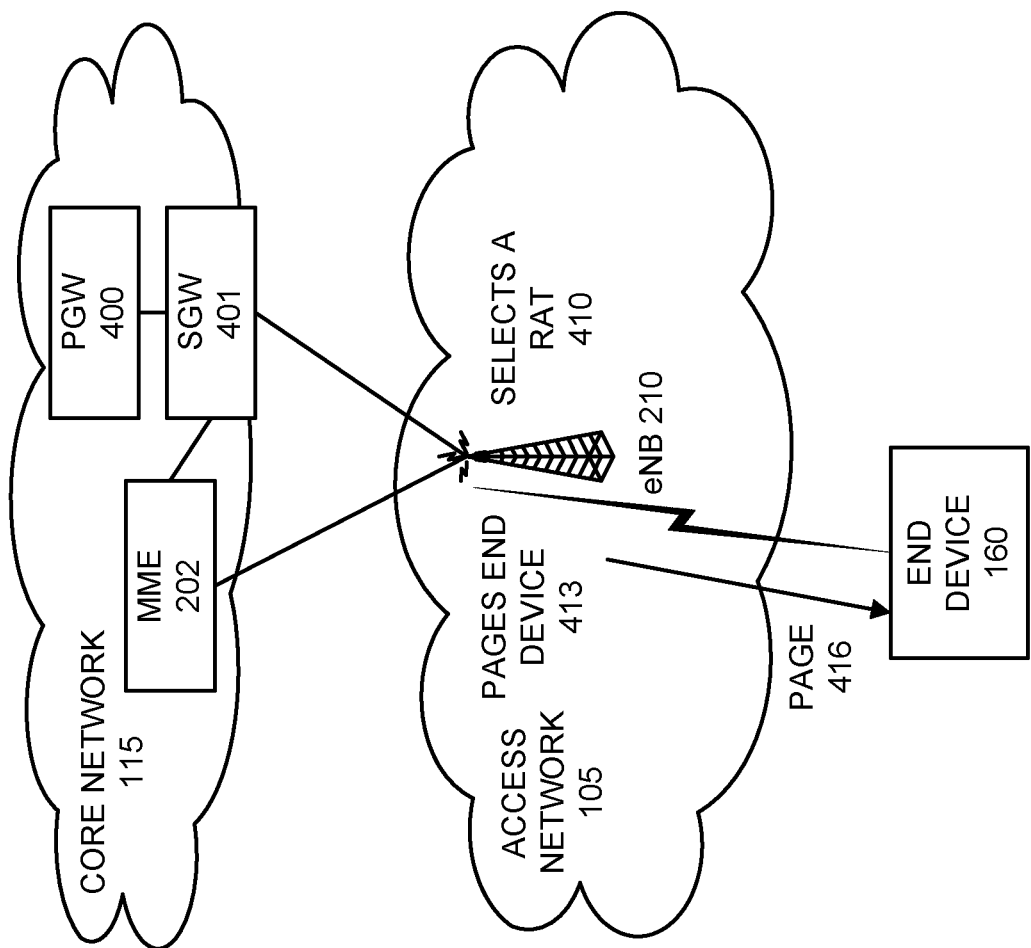

Referring to FIG. 4B, eNB 210 selects a RAT 410 to use to transmit the downlink data to end device 160 based on the traffic pattern information, the coverage level information, and the load information. For example, eNB 210 includes RAT selection logic that may select the RAT based on this information. The RAT selection logic may use administratively configured heuristics and/or an optimization algorithm as a basis to select the RAT. According to other implementations, eNB 210 may select the RAT based on additional, fewer, and/or different types of information (e.g., traffic pattern information and load information; traffic pattern information and coverage level information; etc.). As further illustrated, eNB 210 pages 413 end device 160 via page 416. According to this exemplary scenario, assume end device 160 is connected to eNB 210 via a default RAT, and eNB 210 pages end device 160 via the default RAT. According to other exemplary scenarios, eNB 210 may page end device 160 via a non-default RAT which end device 160 may be currently connected to eNB 210. The page may indicate that there is downlink data for end device 160.

Figure 4C:
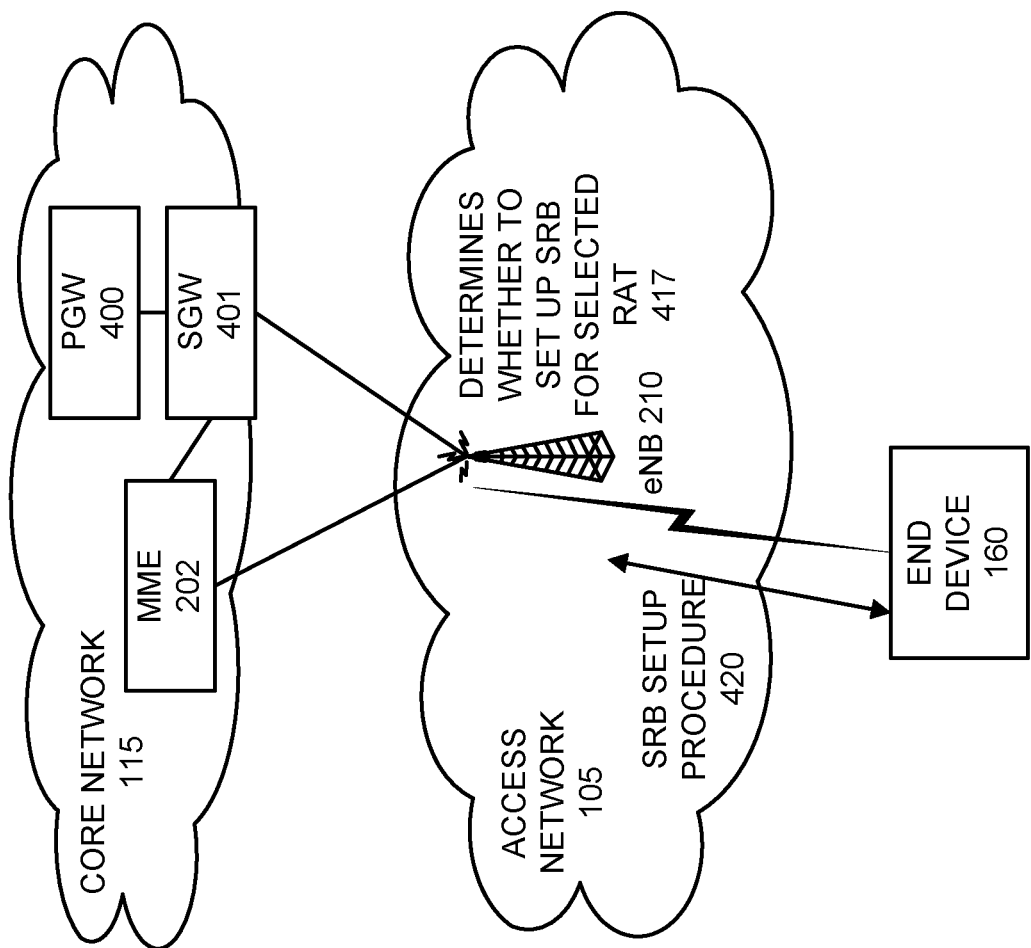
Figure 4D:
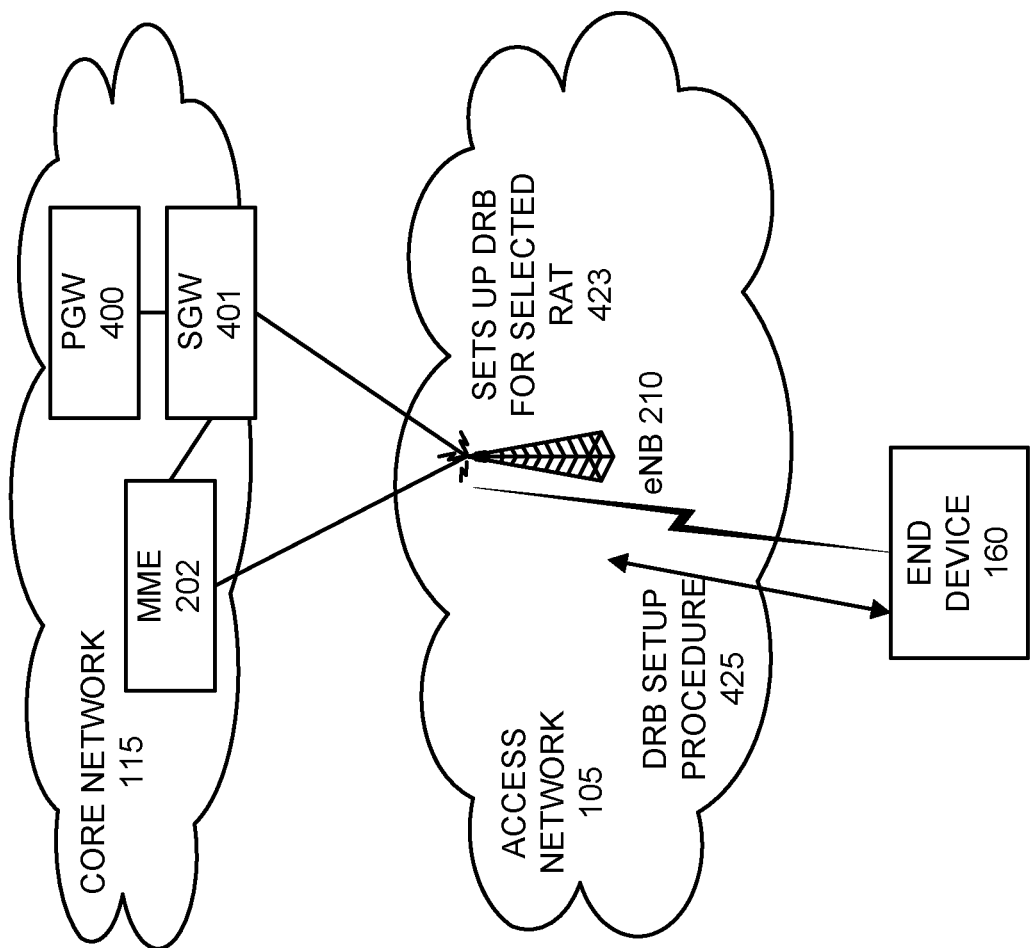

Referring to FIG. 4C, eNB 210 may determine whether to set up an SRB for the selected RAT 417. For example, according to an exemplary scenario, assume that end device 160 is camped on a cell of eNB 210 using a default RAT, but the selected RAT is a non-default RAT. Under such circumstance, eNB 210 may determine that an SRB should be set up for the selected RAT. In response to such a determination, eNB 210 and end device 160 may perform an SRB setup procedure 420. According to other examples, when eNB 210 determines that an SRB does not need to be established for the selected RAT, these operations may be omitted. Similarly, referring to FIG. 4D, eNB 210 may determine whether to set up a DRB on the selected RAT 423, and if so, perform a DRB setup procedure 425. Otherwise, these operations may be omitted.

Figure 4E:
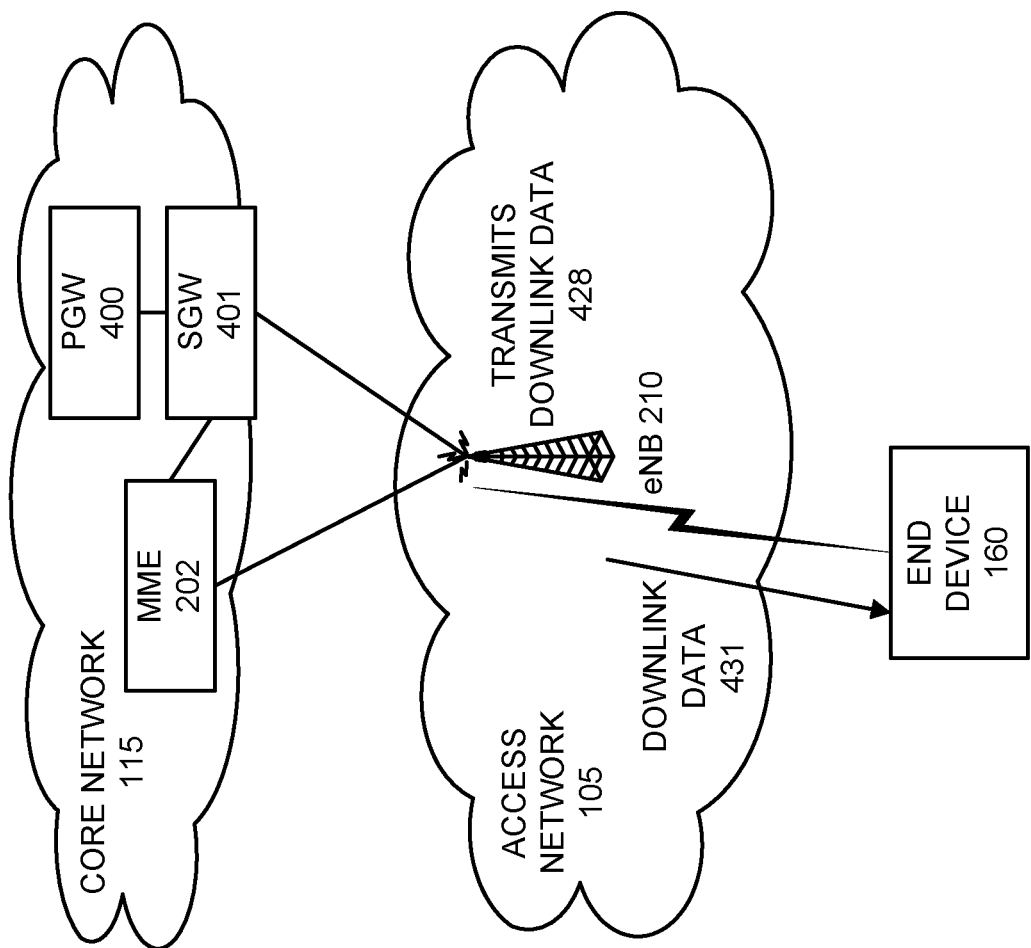
Figure 4F:
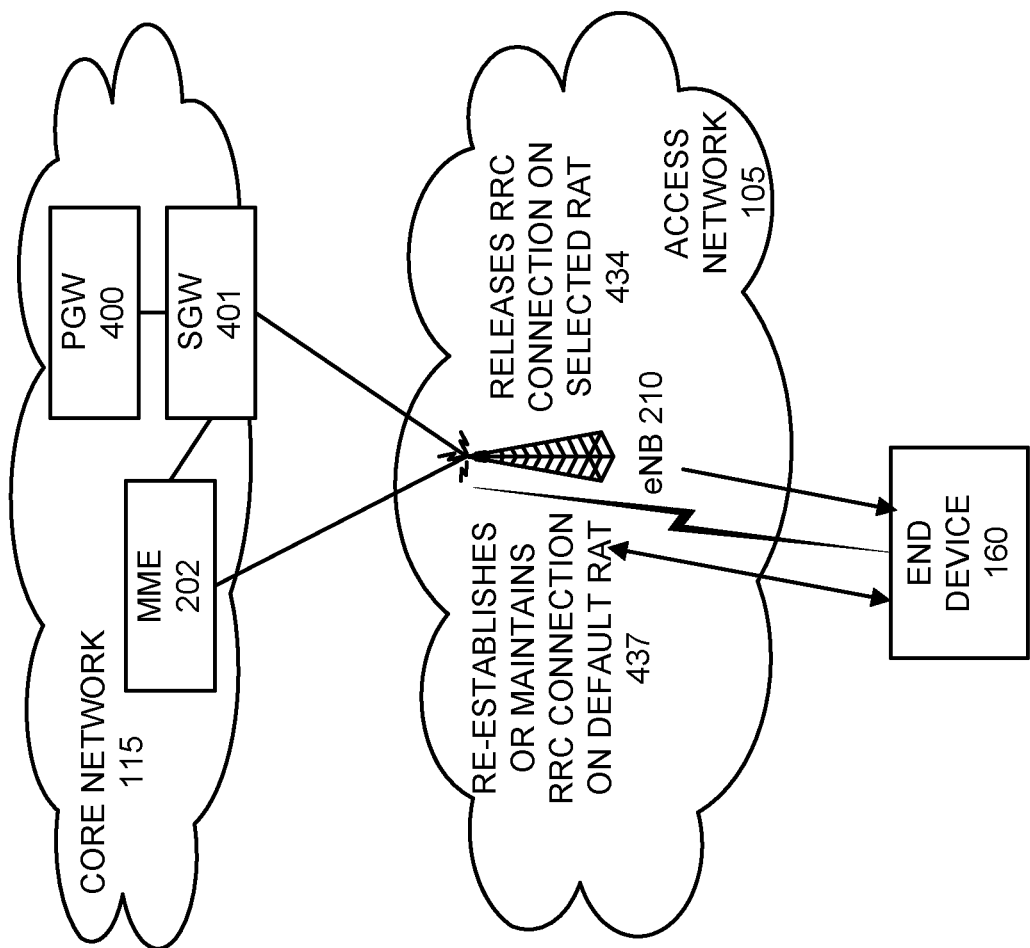

Referring to FIG. 4E, eNB 210 may transmit the downlink data 428 to end device 160 via the selected RAT and the DRB (illustrated as downlink data 431). Referring to FIG. 4F, when the transmission is completed, eNB 210 may release the RRC connection on the selected RAT 434. Depending on the multi-RAT capabilities of end device 160, end device 160 and/or eNB 210 may re-establish or maintain an RRC connection on the default RAT 437.

Although FIGS. 4A-4F illustrate an exemplary process of the RAT selection service, according to other exemplary embodiments, additional, fewer, and/or different operations may be performed.

Figure 5A:
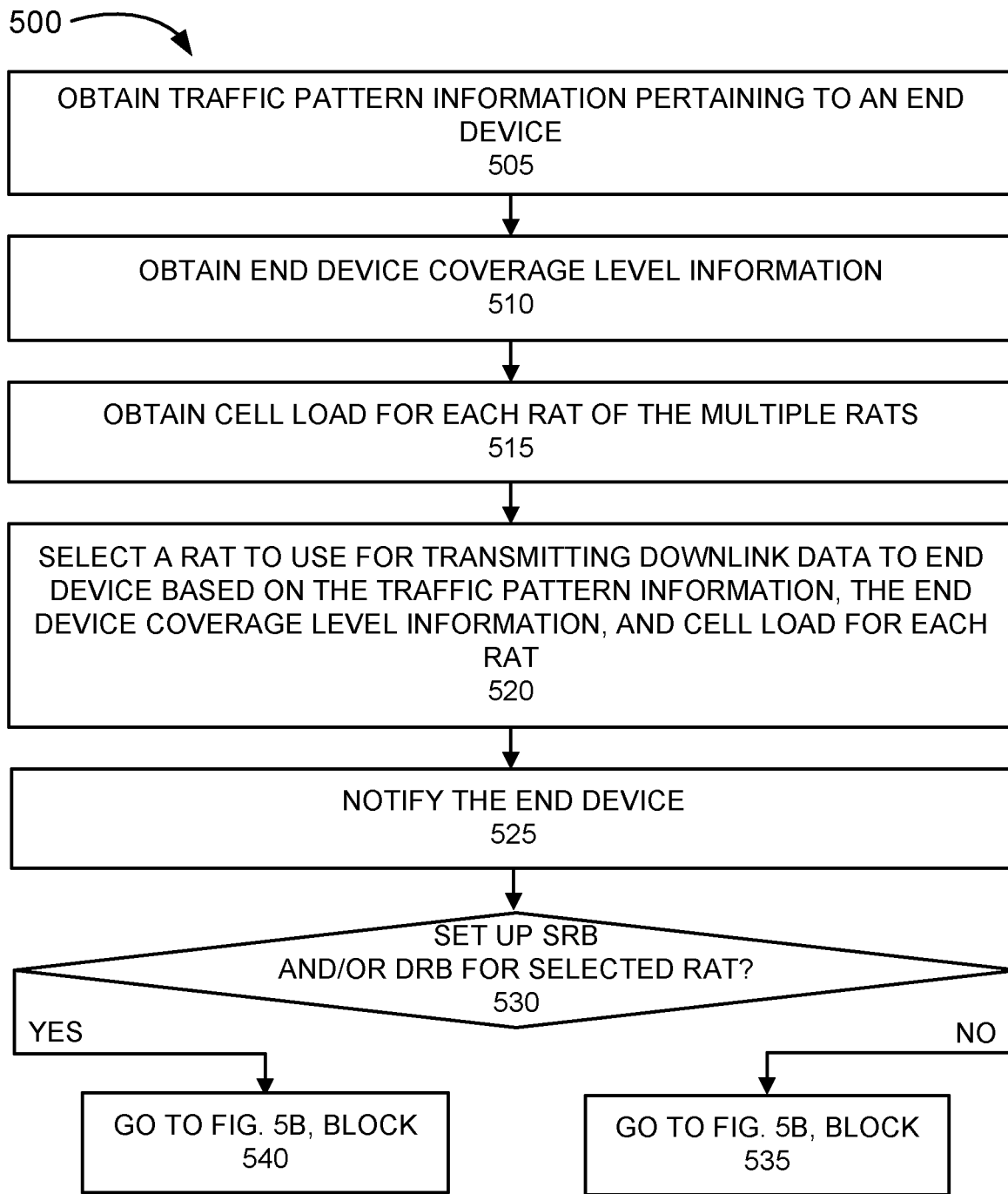
FIGS. 5A and 5B are flow diagrams of an exemplary process of the RAT selection service.
Figure 5B:
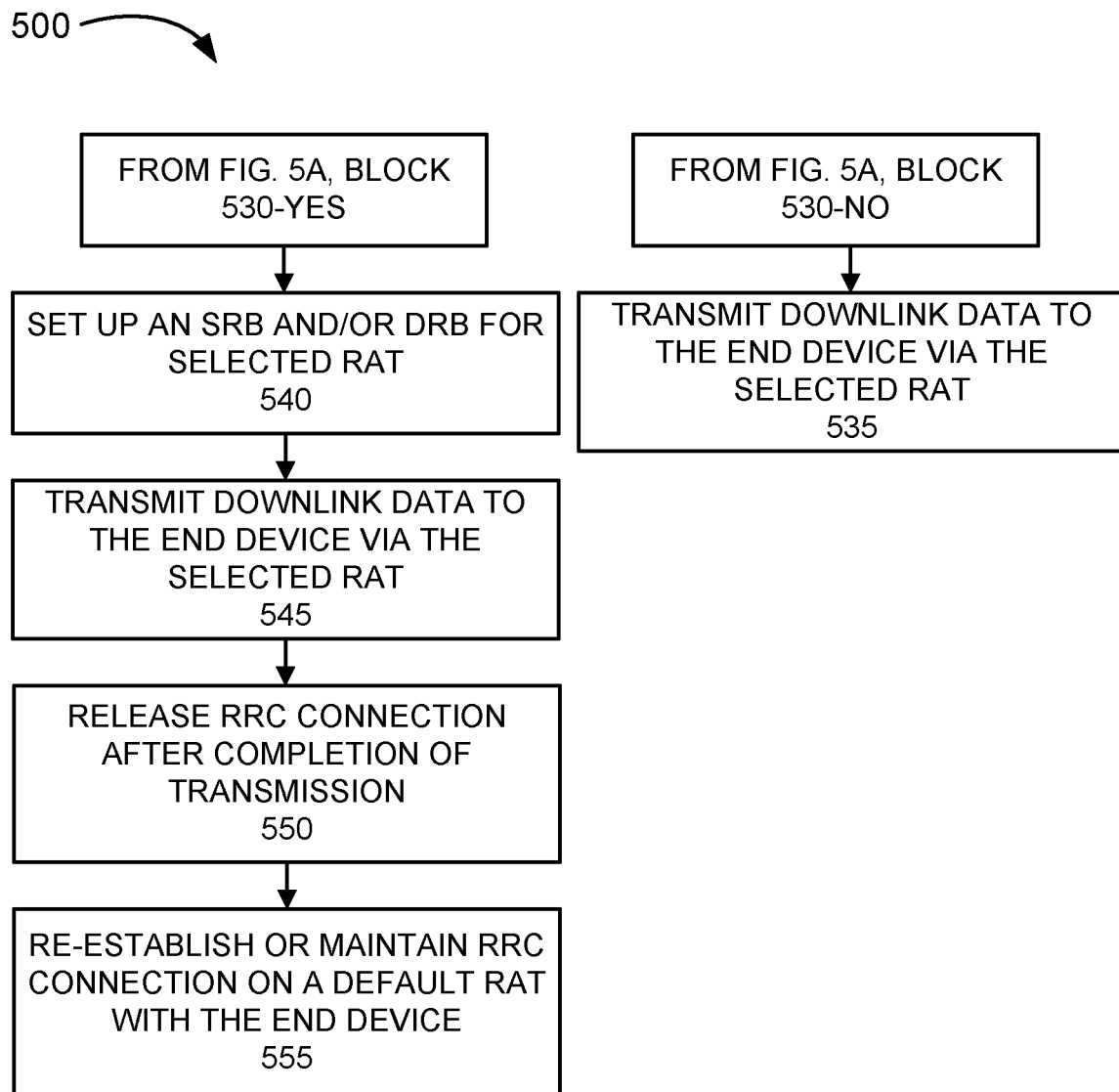

FIGS. 5A and 5B are flow diagrams illustrating an exemplary process 500 pertaining to the RAT selection service. According to an exemplary embodiment, wireless station 110 performs steps of process 500. For example, processor 810 executes software 820 to perform the steps illustrated in FIGS. 5A and 5B and described herein. According to an exemplary scenario, assume that wireless station 110 has data to transmit to end device 160. The data may pertain to an end device application of end device 160.

Referring to FIG. 5A, in block 505 of process 500, traffic pattern information pertaining to an end device may be obtained. For example, wireless station 110 may obtain traffic pattern information from network device 117. In block 510, end device coverage level information may be obtained. For example, wireless station 110 may obtain end device coverage level information from a multi-RAT communication interface of wireless station 110 in response to receiving the downlink data. In block 515, cell load information for each RAT of the multiple RATs may be obtained. For example, wireless station 110 may obtain cell load information for each RAT from a multi-RAT communication interface of wireless station 110 and/or RRM logic in response to receiving the downlink data. In block 520, a RAT to use for transmitting downlink data to the end device may be selected based on the traffic pattern information, the end device coverage level information, and the cell load for each RAT. For example, wireless station 110 includes RAT selection logic that selects an appropriate RAT based on the available information.

In block 525, the end device may be notified. For example, wireless station 110 may page end device 160 via a default RAT of end device 160. The page may inform end device 160 of the data to be downloaded. In block 530, it may be determined whether to set up an SRB and/or a DRB for the selected RAT. For example, wireless station 110 may access context information, which may be stored by wireless station 110, to determine whether the SRB and/or the DRB of the selected RAT for downloading the data has already been established with end device 160.

Referring to FIG. 5B, when it is determined that the SRB and/or the DRB does not need to be set up (block 530—NO), the downlink data may be transmitted to the end device via the selected RAT (block 535). For example, wireless stations 110 may download the data via the selected RAT and the DRB pertaining to the selected RAT.

When it is determined that the SRB and/or the DRB does need to be set up (block 530—YES), the SRB and/or the DRB may be set up on the selected RAT (block 540). For example, wireless station 110 may establish an SRB and/or the DRB via the selected RAT with end device 160. In block 545, the downlink data may be transmitted via the selected RAT. For example, wireless station 110 may transmit the data via the selected RAT and the DRB pertaining to the selected RAT.

In block 550, the RRC connection may be released after completion of the transmission. For example, wireless station 110 may detect when the transmission of the download data has been completed. In response to this detection or other triggering event (e.g., inactivity, etc.), wireless station 110 may release the RRC connection of the non-default RAT with end device 160. For example, wireless station 110 may transmit an RRC Connection Release message to end device 160.

In block 555, an RRC connection via a default RAT may be re-established or maintained with the end device. For example, wireless station 110 and/or end device 160 may re-establish or maintain the RRC connection via the default RAT.

Although FIGS. 5A and 5B illustrate an exemplary process 500 of the RAT selection service, according to other embodiments, process 500 may include additional operations, fewer operations, and/or different operations than those illustrated in FIGS. 5A and 5B and described herein.

FIGS. 6A-6G are diagrams illustrating still another exemplary process of the RAT selection service. In FIGS. 6A-6G, assume that access network 105 is implemented as an E-UTRAN of an LTE or LTE-A network, and that wireless station 110 is implemented as eNB 210. Assume that end device 160 has multi-RAT capabilities. Also assume that core network 115 is implemented as an EPC. According to an exemplary scenario, end device 160 has uplink data of an application to transmit (e.g., to another end device 160 (not illustrated), a server (not illustrated), etc.). For example, the uplink data may pertain to a critical application or another type of application, as described herein.

Figure 6A:
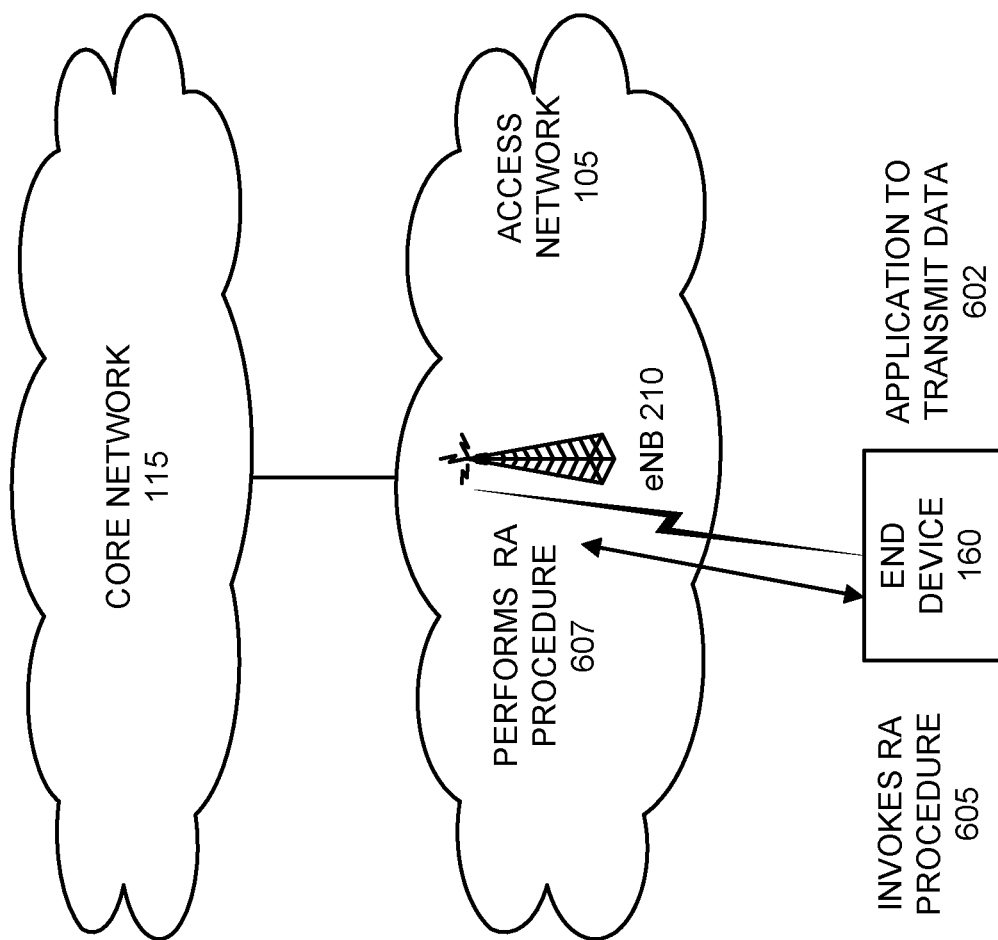
FIGS. 6A-6G are diagrams illustrating still another exemplary process of the RAT selection service.

Referring to FIG. 6A, according to an exemplary scenario, assume that end device 160 has data to transmit 602 via eNB 210. For example, an application resident on end device 160 has made a request to transmit data or some other triggering event causes end device 160 to enter a state by which data is to be transmitted. In response, end device 160 may invoke a Random Access (RA) procedure 605, and an RA procedure with eNB 210 may be performed 607. The RA procedure may be performed using a default RAT of end device 160.

Figure 6B:
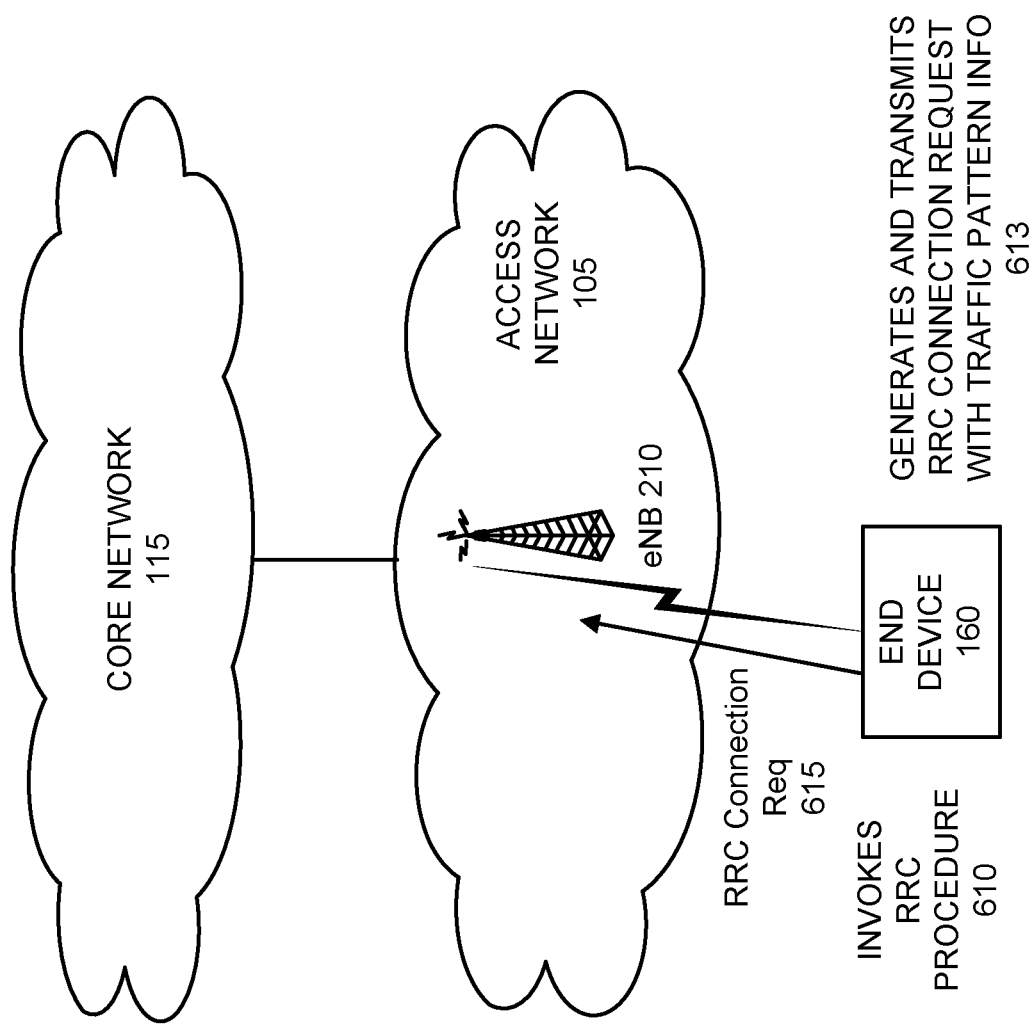

Referring to FIG. 6B, when the RA procedure is successfully completed, end device 160 initiates an RRC Connection Establishment procedure 610. For example, after receiving a Random Access Response message from eNB 210, end device 160 may generate and transmit an RRC Connection Request to eNB 210 using the default RAT. According to an exemplary embodiment, the RRC Connection Request includes an IE that carries traffic pattern information 613 pertaining to the uplink data (illustrated as RRC Connection Req. 615).

Figure 6C:
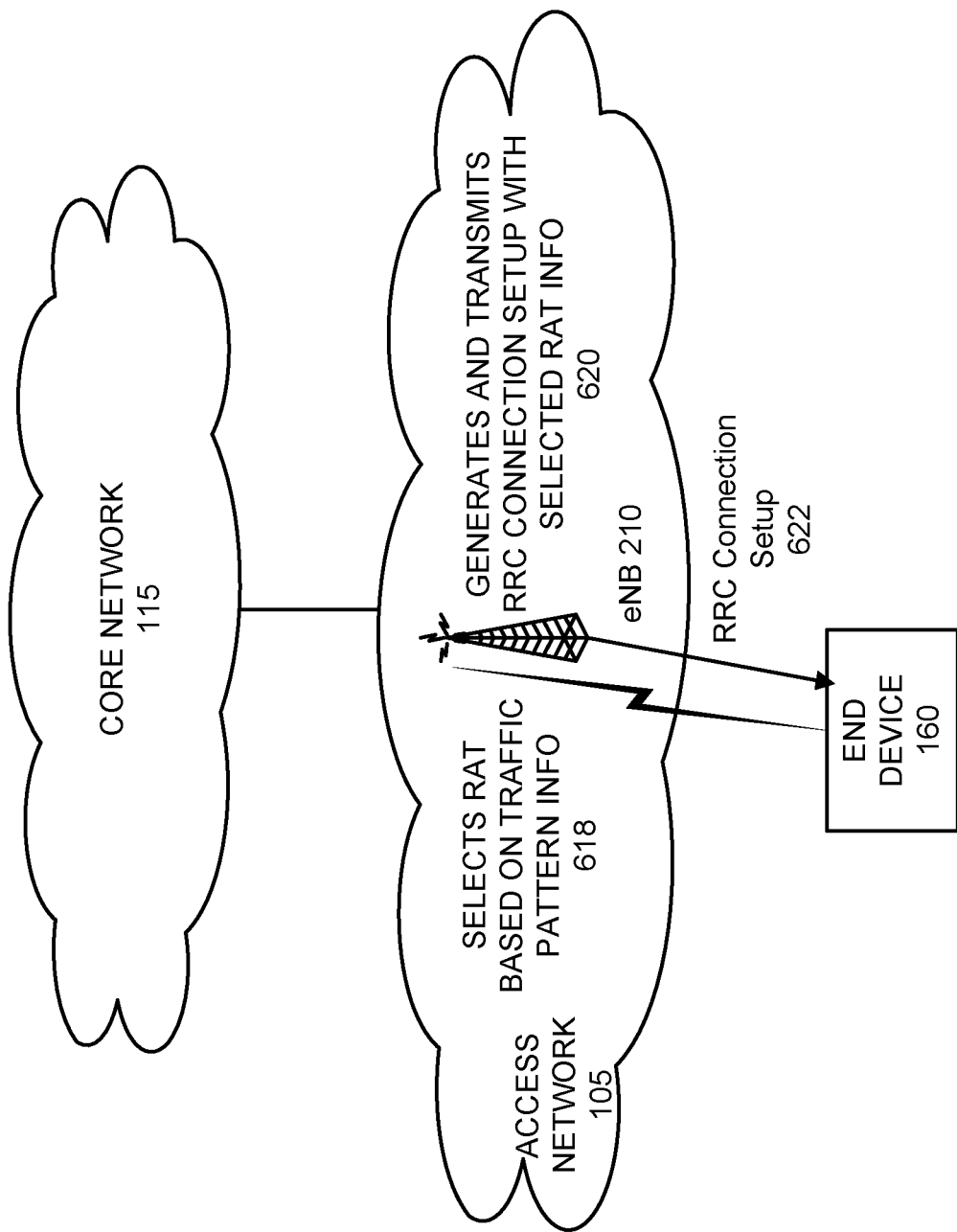

Referring to FIG. 6C, in response to receiving the RRC Connection Request, which carries the traffic pattern information, eNB 210 may select a RAT for which the uplink data is to be transmitted 618. For example, eNB 210 may obtain coverage level information and load information for each RAT, as previously described. eNB 210 may select the RAT based on the traffic pattern information, the coverage level information, and the load information, as previously described. In response to selecting the RAT, eNB 210 may generate and transmit an RRC Connection Setup message, which includes an IE that indicates the selected RAT 620 (illustrated as RRC Connection Setup 622).

Figure 6D:
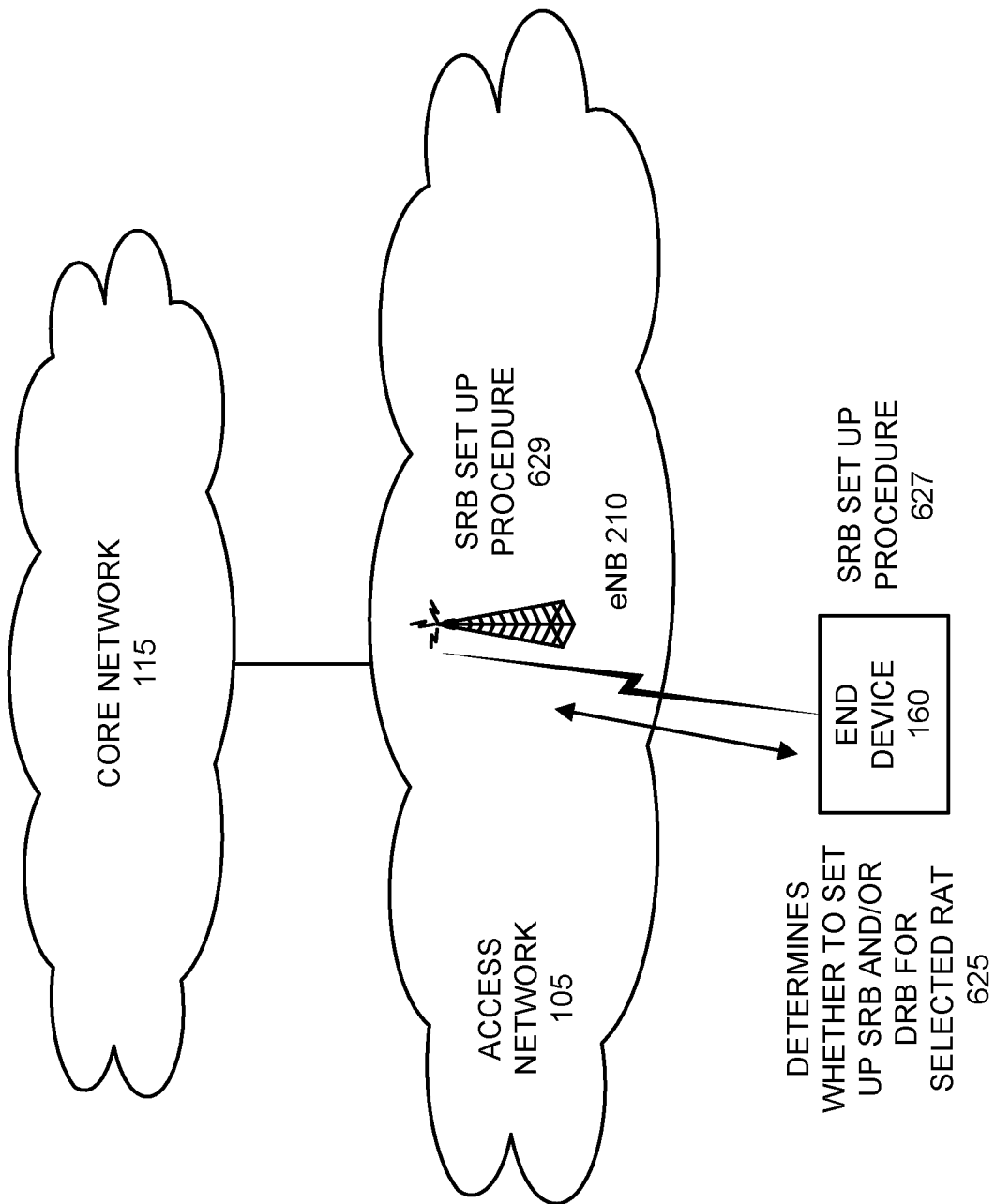
Figure 6E:
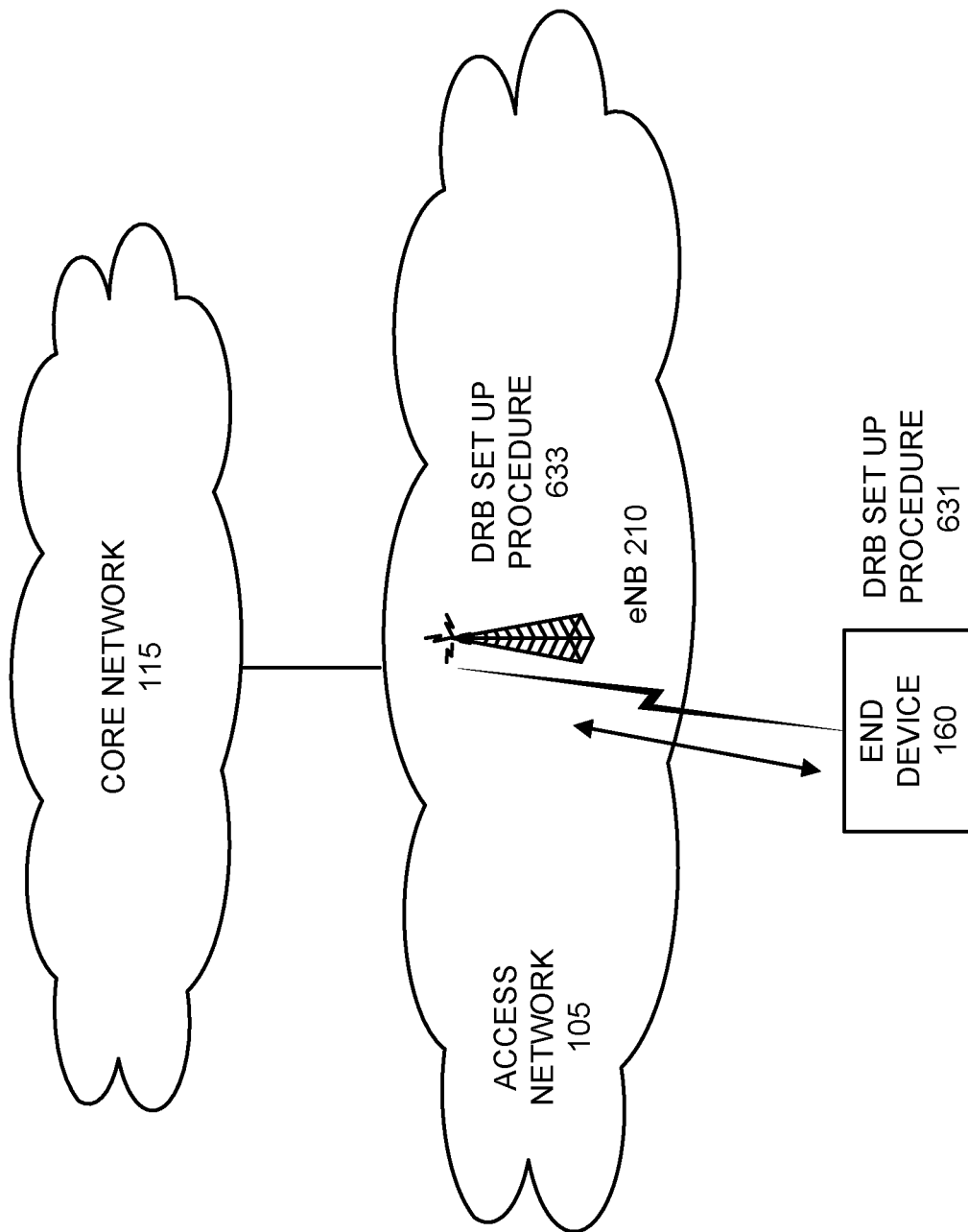

Referring to FIG. 6D, in response to receiving the selected RAT information, end device 160 may determine whether an SRB and/or a DRB for the selected RAT needs to be set up 625. If so, end device 160 and eNB 210 may each perform their part in setting up an SRB (illustrated as SRB setup procedures 627 and 629). Referring to FIG. 6E, additionally, if a DRB for the selected RAT needs to be set up, end device 160 and eNB 210 may each perform their part in setting up a DRB (illustrated as DRB setup procedures 631 and 633).

Figure 6F:
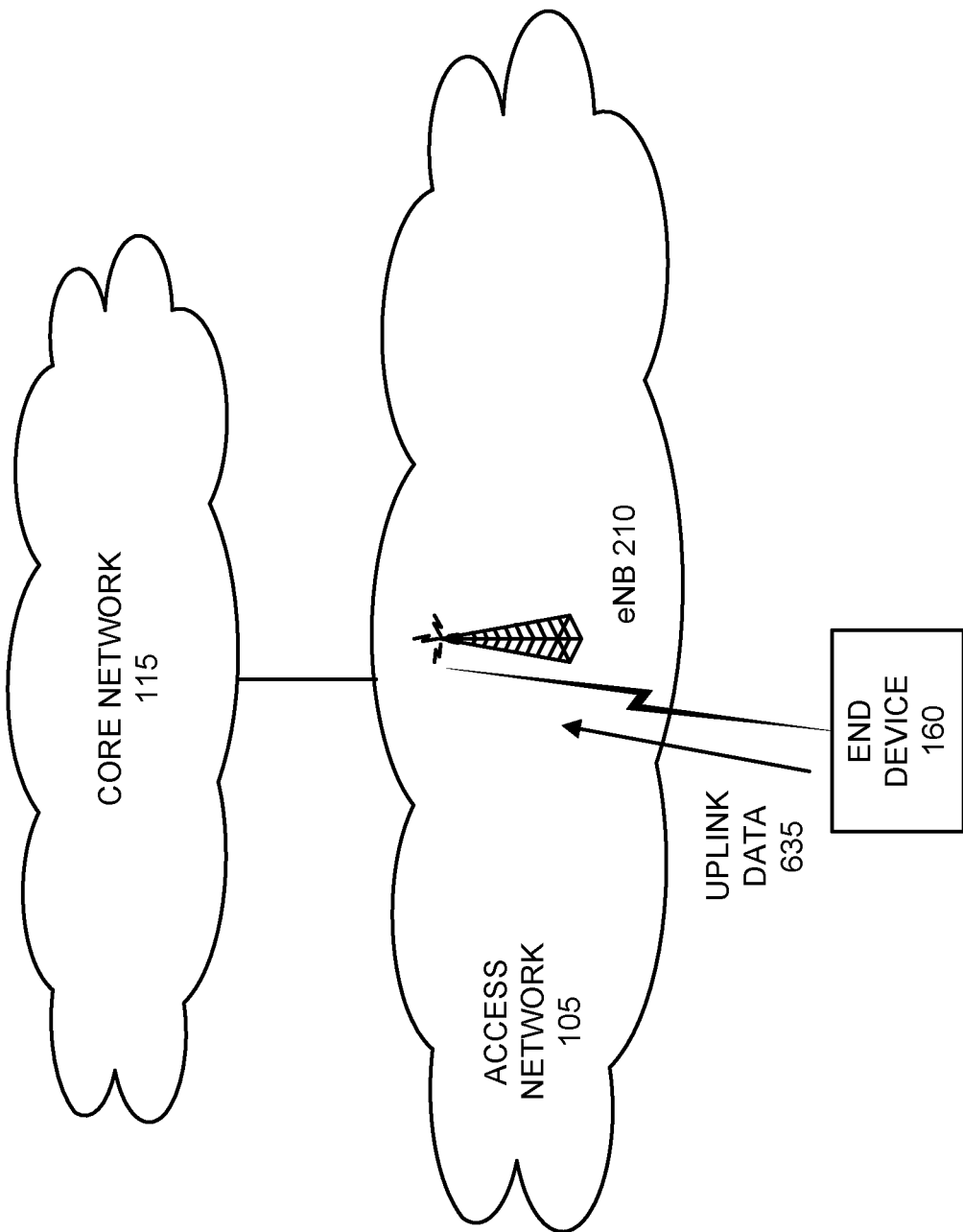
Figure 6G:
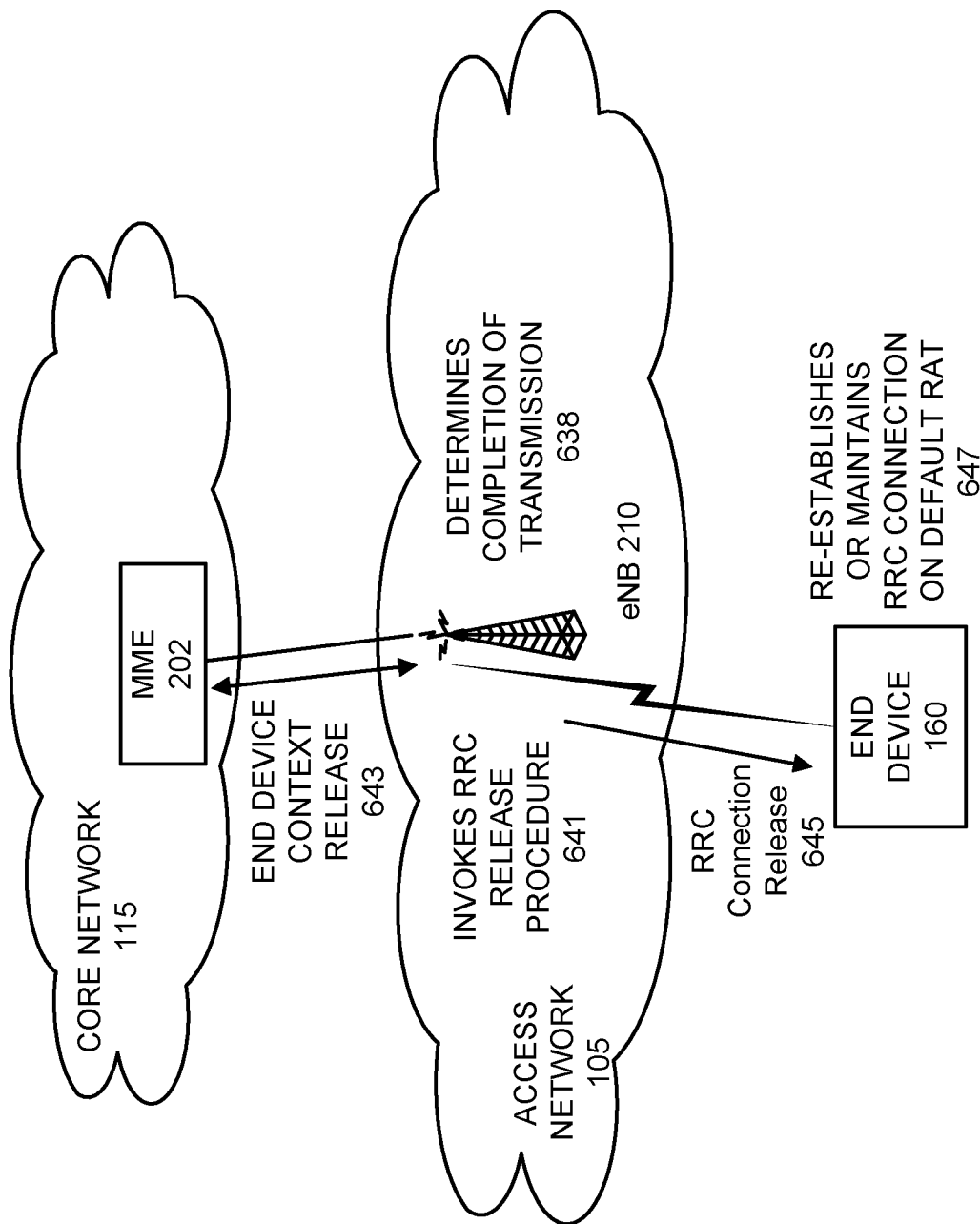

Referring to FIG. 6F, end device 160 may transmit the uplink data 635 via the selected RAT and the established DRB. Referring to FIG. 6G, operations similar to those described in relation to FIG. 4F may be performed. For example, when the selected RAT is not the default RAT, eNB 210 may determine the completion of the uplink transmission 638 and invoke an RRC release procedure 641, which includes the transmission of an RRC Connection Release message 645, to end device 160. The RRC connection via the selected RAT may be terminated. Thereafter, end device 160 may re-establish or maintain the RRC connection via the default RAT 647. As further illustrated, eNB 210 may transmit end device context release information 643 to MME 202 based on the termination of the RRC connection release of the selected RAT.

Although FIGS. 6A-6G illustrate an exemplary process of the RAT selection service, according to other exemplary embodiments, additional, fewer, and/or different operations may be performed.

Figure 7:
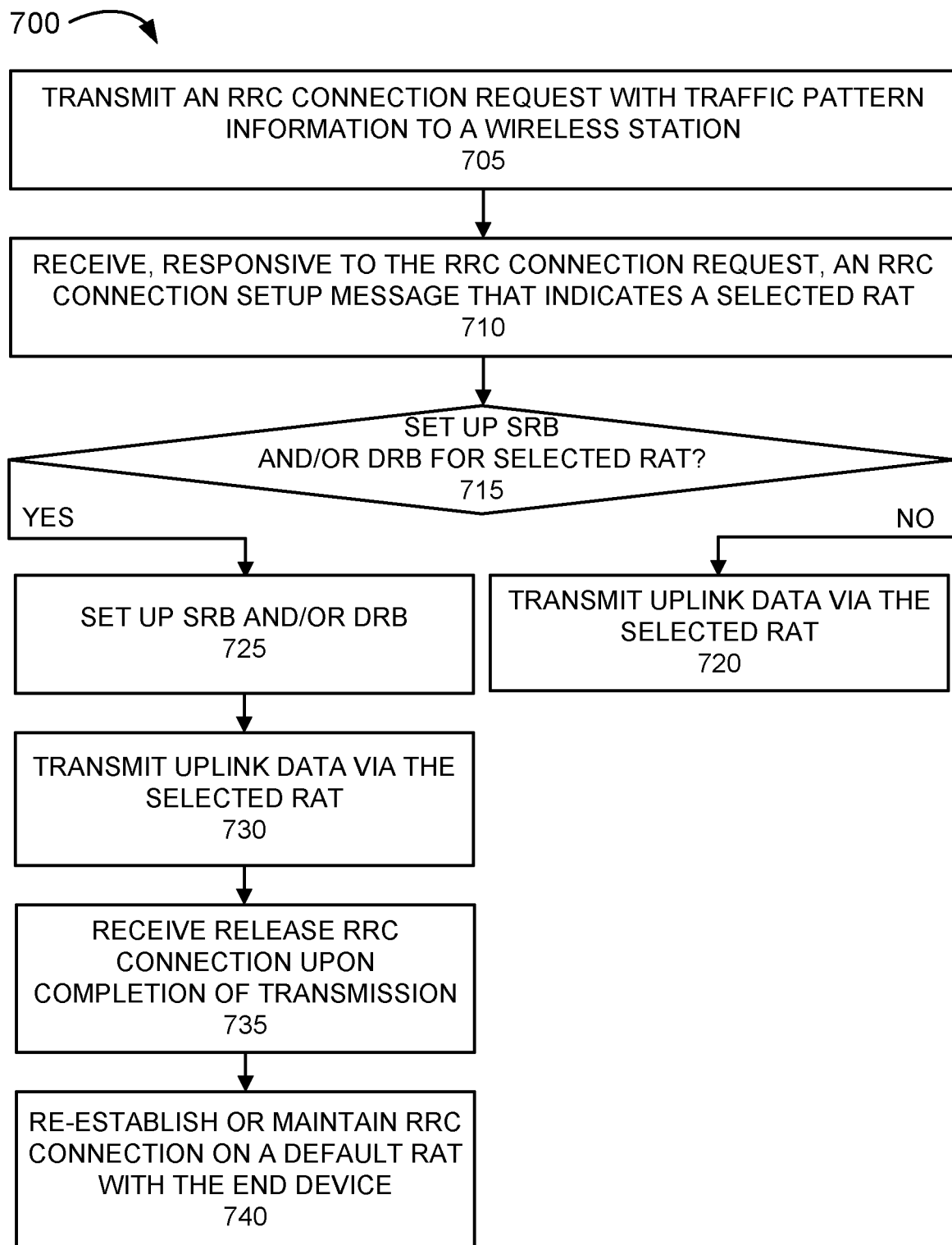
FIG. 7 is a flow diagram of an exemplary process of the RAT selection service.

FIG. 7 is a flow diagram illustrating an exemplary process 700 pertaining to the RAT selection service. According to an exemplary embodiment, end device 160 performs steps of process 700. For example, processor 810 executes software 820 to perform the steps illustrated in FIG. 7 and described herein.

Referring to FIG. 7A, block 705, process 700 may begin with receiving data from an application or other source. For example, end device 160 may enter a state in which data is to be transmitted via access network 105 and wireless station 110. End device 160 may generate and transmit an RRC Connection Request message to wireless station 110. The RRC Connection Request message may include an IE that carries data indicating traffic pattern information pertaining to the uplink data to be transmitted by end device 160. The RRC Connection Request message may be transmitted via a default RAT of end device 160.

In block 710, an RRC Connection Setup message, which includes information indicating a selected RAT, may be received. For example, in response to the RRC Connection Request message, end device 160 may receive the RRC Connection Setup message from wireless station 110. The RRC Connection Setup message may include an IE that carries data indicating a selected RAT to be used to transmit the uplink data. Depending on the outcome of the RAT selection process performed by wireless station 110, the selected RAT may or may not be the default RAT. End device 160 may read the IE and identify the selected RAT.

In block 715, it may be determined whether to set up an SRB and/or a DRB for the selected RAT. For example, based on the identification of the selected RAT, end device 160 may determine whether the SRB and/or the DRB of the selected RAT for transmitting the data has already been established with wireless station 110.

In response to determining that an SRB and/or a DRB for the selected RAT does not need to be established (block 715—NO), the uplink data may be transmitted (block 720). For example, end device 160 may transmit the uplink data using the selected RAT (e.g., the default RAT) via wireless station 110.

In response to determining that an SRB and/or a DRB for the selected RAT does need to be established (block 715—YES), the SRB and/or the DRB may be set up (block 725). For example, end device 160 and wireless station 110 may establish the SRB and/or the DRB of the selected RAT.

In block 730, the uplink data may be transmitted via the selected RAT. For example, end device 160 may transmit the data to a destination device via the selected RAT and the DRB pertaining to the selected RAT.

In block 735, the RRC connection may be released after completion of the transmission. For example, wireless station 110 may detect when the transmission of the download data has been completed. In response to this detection or other triggering event (e.g., inactivity, etc.), wireless station 110 may release the RRC connection of the non-default RAT with end device 160. For example, wireless station 110 may transmit an RRC Connection Release message to end device 160.

In block 740, an RRC connection via a default RAT may be re-established or maintained with the end device. For example, wireless station 110 and/or end device 160 may re-establish or maintain the RRC connection via the default RAT.

Although FIG. 7 illustrates an exemplary process 700 of the RAT selection service, according to other embodiments, process 700 may include additional operations, fewer operations, and/or different operations than those illustrated in FIG. 7 and described herein.

FIG. 8 is a diagram illustrating exemplary components of a device 800 that may correspond to one or more of the devices described herein. For example, device 800 may correspond to components of wireless station 110, network device 117, end device 160, eNB 210, MME 202, PGW 400, SGW 401, and other network devices described herein. As illustrated in FIG. 8, device 800 includes a bus 805, a processor 810, a memory/storage 815 that stores software 820, a communication interface 825, an input 830, and an output 835. According to other embodiments, device 800 may include fewer components, additional components, different components, and/or a different arrangement of components than those illustrated in FIG. 8 and described herein.

Bus 805 includes a path that permits communication among the components of device 800. For example, bus 805 may include a system bus, an address bus, a data bus, and/or a control bus. Bus 805 may also include bus drivers, bus arbiters, bus interfaces, clocks, and so forth.

Processor 810 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 810 may be implemented as hardware (e.g., a microprocessor, etc.), a combination of hardware and software (e.g., a SoC, an ASIC, etc.), may include one or multiple memories (e.g., cache, etc.), etc.

Processor 810 may control the overall operation or a portion of operation(s) performed by device 800. Processor 810 may perform one or multiple operations based on an operating system and/or various applications or computer programs (e.g., software 820). Processor 810 may access instructions from memory/storage 815, from other components of device 800, and/or from a source external to device 800 (e.g., a network, another device, etc.). Processor 810 may perform an operation and/or a process based on various techniques including, for example, multithreading, parallel processing, pipelining, interleaving, etc.

Memory/storage 815 includes one or multiple memories and/or one or multiple other types of storage mediums. For example, memory/storage 815 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 815 may include a hard disk (e.g., a magnetic disk, an optical disk, a magneto-optic disk, a solid state disk, etc.) and a corresponding drive. Memory/storage 815 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 815 may include drives for reading from and writing to the storage medium.

Memory/storage 815 may be external to and/or removable from device 800, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 815 may store data, software, and/or instructions related to the operation of device 800.

Software 820 includes an application or a program that provides a function and/or a process. As an example, with reference to wireless station 110 and eNB 210, software 820 may include an application that, when executed by processor 810, provides the functions of the RAT selection service, as described herein. Similarly, end device 160 may include an application that, when executed by processor 810, provides the functions of the RAT selection service, as described herein. Software 820 may also include firmware, middleware, microcode, hardware description language (HDL), and/or other form of instruction.

Communication interface 825 permits device 800 to communicate with other devices, networks, systems, and/or the like. Communication interface 825 includes one or multiple wireless interfaces and/or wired interfaces. For example, communication interface 825 may include one or multiple transmitters and receivers, or transceivers. Communication interface 825 may operate according to a protocol stack and a communication standard. Communication interface 825 may include an antenna. Communication interface 825 may include various processing logic or circuitry (e.g., multiplexing/de-multiplexing, filtering, amplifying, converting, error correction, etc.).

Input 830 permits an input into device 800. For example, input 830 may include a keyboard, a mouse, a display, a touchscreen, a touchless screen, a button, a switch, an input port, speech recognition logic, and/or some other type of visual, auditory, tactile, etc., input component. Output 835 permits an output from device 800. For example, output 835 may include a speaker, a display, a touchscreen, a touchless screen, a light, an output port, and/or some other type of visual, auditory, tactile, etc., output component.

Device 800 may perform a process and/or a function, as described herein, in response to processor 810 executing software 820 stored by memory/storage 815. By way of example, instructions may be read into memory/storage 815 from another memory/storage 815 (not shown) or read from another device (not shown) via communication interface 825. The instructions stored by memory/storage 815 cause processor 810 to perform a process described herein. Alternatively, for example, according to other implementations, device 800 performs a process described herein based on the execution of hardware (processor 810, etc.).

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 3A, 3B, 5A, 5B, and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element may include, for example, hardware (e.g., processor 810, etc.), or a combination of hardware and software (e.g., software 820).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 810) of a device. A non-transitory storage medium includes one or more of the storage mediums described in relation to memory/storage 815.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, by a wireless station that includes a first set of radio access technologies (RATs) that is part of a wireless access network and from an end device during an initial Radio Resource Control (RRC) Connection procedure, an RRC Connection request that includes data indicating a second set of RATs;
   storing, by the wireless station, the data indicating the second set of RATs;
   transmitting, by the wireless station to the end device, an RRC Connection Setup message that includes data indicating signaling radio bearer (SRB) configuration information for each RAT of the second set of RATs;
   successfully completing, by the wireless station, the RRC Connection procedure with the end device, wherein the end device has a radio connection with the wireless station via a default RAT of the end device;
   receiving, by the wireless station, first data to be transmitted to the end device that includes the second set of RATs;
   obtaining, by the wireless station, traffic pattern information that indicates one or more characteristics of the first data;
   obtaining, by the wireless station, coverage level information pertaining to the second set of RATs;
   obtaining, by the wireless station, load information pertaining to the second set of RATs;
   selecting, by the wireless station, a RAT included in the first set of RATs and the second set of RATs based on the traffic pattern information, the coverage level information, and the load information; and transmitting, by the wireless station based on the selecting, the first data to the end device via the RAT.

2. The method of claim 1, further comprising:
notifying, by the wireless station via the default RAT of the end device, the end device of the first data to be transmitted, wherein the default RAT is included in the first set of RATs and the second set of RATs;
determining, by the wireless station, whether a signaling radio bearer (SRB) for the RAT is currently established;
establishing, by the wireless station in response to determining that the SRB is not currently established, the SRB;
determining, by the wireless station, whether a data radio bearer (DRB) for the RAT is currently established; and
establishing, by the wireless station in response to determining that the DRB is not currently established, the DRB.

3. The method of claim 2, wherein the RAT is not the default RAT.

4. The method of claim 3, further comprising:
detecting, by the wireless station, that the transmitting of the first data is completed;
releasing, by the wireless station in response to the detecting, the SRB and the DRB of the RAT; and
maintaining, by the wireless station, a radio connection with the end device via the default RAT.

5. The method of claim 1,
wherein the wireless station is an evolved Node B (eNB), an evolved Long Term Evolution (eLTE) eNB, or a next generation Node B.

6. The method of claim 5, further comprising:
receiving, by the wireless station from the end device, an attach request;
transmitting, by the wireless station, the attach request to a network device of a core network for the wireless access network;
receiving, by the wireless station from the network device, an attach response that includes configuration information pertaining to at least one of a power saving mode (PSM), discontinuous reception (DRX), or extended DRX and the end device for each RAT of the second set of RATs; and
transmitting, by the wireless station to the end device, the attach response.

7. The method of claim 1, wherein the one or more characteristics include one or more of an amount of data of a traffic flow pertaining to the first data, a duration of the traffic flow pertaining to the first data, or a packet size.

8. The method of claim 1, wherein the first set of RATs and the second set of RATs each include two or more of Long Term Evolution (LTE), LTE-Advanced, enhanced Machine Type Communication (eMTC) mode A, an eMTC mode B, a NarrowBand Internet of Things (NB-IoT), or Fifth Generation New Radio (5G NR), and wherein the first set of RATs share a same Transmit Time Interval (TTI) that are time aligned.

9. A wireless station comprising:
a communication interface that includes a first set of radio access technologies (RATs);
a memory, wherein the memory stores first instructions; and
a processor, wherein the processor executes the instructions to:
receive, via the communication interface from an end device during an initial Radio Resource Control (RRC) Connection procedure, an RRC Connection request that includes data indicating a second set of RATs, wherein the wireless station is part of a wireless access network;
store the data indicating the second set of RATs;
transmit, via the communication interface to the end device, an RRC Connection Setup message that includes data indicating signaling radio bearer (SRB) configuration information for each RAT of the second set of RATs;
successfully complete the RRC Connection procedure with the end device, wherein the end device has a radio connection with the wireless station via a default RAT of the end device;
receive, via the communication interface, first data to be transmitted to the end device that includes the second set of RATs;
obtain traffic pattern information that indicates one or more characteristics of the first data;
obtain coverage level information pertaining to the second set of RATs;
obtain load information pertaining to the second set of RATs;
select a RAT included in the first set of RATs and the second set of RATs based on the traffic pattern information, the coverage level information, and the load information; and
transmit, via the communication interface based on the selection, the first data to the end device via the RAT.

10. The wireless station of claim 9, wherein the processor further executes the instructions to:
notify, via the communication interface and the default RAT of the end device, the end device of the first data to be transmitted, wherein the default RAT is included in the first set of RATs and the second set of RATs;
determine whether a signaling radio bearer (SRB) for the RAT is currently established;
establish, via the communication interface in response to a determination that the SRB is not currently established, the SRB;
determine, via the communication interface, whether a data radio bearer (DRB) for the RAT is currently established; and
establish, via the communication interface in response to a determination that the DRB is not currently established, the DRB.

11. The wireless station of claim 10, wherein the RAT is not the default RAT.

12. The wireless station of claim 11, wherein the processor further executes the instructions to:
detect that the transmission of the first data is completed;
release, in response to the detection, the SRB and the DRB of the RAT; and
maintain, via the communication interface, a radio connection with the end device via the default RAT.

13. The wireless station of claim 9, wherein the wireless station is an evolved Node B (eNB), an evolved Long Term Evolution (eLTE) eNB, or a next generation Node B.

14. The wireless station of claim 13, wherein the processor further executes the instructions to:
receive, via the communication interface from the end device, an attach request;
transmit, via the communication interface, the attach request to a network device of a core network for the wireless access network;
receive, from the network device, an attach response that includes configuration information pertaining to at least one of a power saving mode (PSM), discontinuous reception (DRX), or extended DRX and the end device for each RAT of the second set of RATs; and transmit, via the communication interface to the end device, the attach response.

15. The wireless station of claim 9, wherein the first set of RATs and the second set of RATs each include two or more of Long Term Evolution (LTE), LTE-Advanced, enhanced Machine Type Communication (eMTC) mode A, an eMTC mode B, a NarrowBand Internet of Things (NB-IoT), or Fifth Generation New Radio (5G NR), and wherein the first set of RATs share a same Transmit Time Interval (TTI) that are time aligned.

16. A non-transitory computer-readable storage medium storing instructions executable by a processor of a device that includes a first set of radio access technologies (RATs) and is part of a wireless access network, which when executed cause the device to:

receive, from an end device during an initial Radio Resource Control (RRC) Connection procedure, an RRC Connection request that includes data indicating a second set of RATs;

store the data indicating the second set of RATs;

transmit to the end device, an RRC Connection Setup message that includes data indicating signaling radio bearer (SRB) configuration information for each RAT of the second set of RATs;

successfully complete the RRC Connection procedure with the end device, wherein the end device has a radio connection with the device via a default RAT of the end device;

receive first data to be transmitted to the end device that includes the second set of RATs;

obtain traffic pattern information that indicates one or more characteristics of the first data;

obtain coverage level information pertaining to the second set of RATs;

obtain load information pertaining to the second set of RATs;

select a RAT included in the first set of RATs and the second set of RATs based on the traffic pattern information, the coverage level information, and the load information; and transmit, based on the selection, the first data to the end device via the RAT.

17. The non-transitory computer-readable storage medium of claim 16, further storing instructions executable by the processor of the device, which when executed cause the device to:

notify, via the default RAT of the end device, the end device of the first data to be transmitted, wherein the default RAT is included in the first set of RATs and the second set of RATs;

determine whether a signaling radio bearer (SRB) for the RAT is currently established;

establish, in response to a determination that the SRB is not currently established, the SRB;

determine whether a data radio bearer (DRB) for the RAT is currently established; and establish, in response to a determination that the DRB is not currently established, the DRB, wherein the RAT is not the default RAT.

18. The non-transitory computer-readable storage medium of claim 17, further storing instructions executable by the processor of the device, which when executed cause the device to:

detect that the transmission of the first data is completed;

release, in response to the detection, the SRB and the DRB of the RAT; and maintain a radio connection with the end device via the default RAT.

19. The non-transitory computer-readable storage medium of claim 16, wherein the device is an evolved Node B (eNB), an evolved Long Term Evolution (eLTE) eNB, or a next generation Node B.

20. The non-transitory computer-readable storage medium of claim 16, wherein the first set of RATs and the second set of RATs each include two or more of Long Term Evolution (LTE), LTE-Advanced, enhanced Machine Type Communication (eMTC) mode A, an eMTC mode B, a NarrowBand Internet of Things (NB-IoT), or Fifth Generation New Radio (5G NR), and wherein the first set of RATs share a same Transmit Time Interval (TTI) that are time aligned.

* * * * *